(12) United States Patent
Masuda

(10) Patent No.: US 12,413,144 B2
(45) Date of Patent: Sep. 9, 2025

(54) COMPOSITE COMPONENT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuki Masuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 811 days.

(21) Appl. No.: 17/632,742

(22) PCT Filed: Aug. 3, 2020

(86) PCT No.: PCT/JP2020/029619
§ 371 (c)(1),
(2) Date: Feb. 3, 2022

(87) PCT Pub. No.: WO2021/029244
PCT Pub. Date: Feb. 18, 2021

(65) Prior Publication Data
US 2022/0277885 A1    Sep. 1, 2022

(30) Foreign Application Priority Data
Aug. 9, 2019   (JP) .................................. 2019-146946

(51) Int. Cl.
*H01F 27/29*   (2006.01)
*H01F 27/28*   (2006.01)
(Continued)

(52) U.S. Cl.
CPC ........ *H02M 3/003* (2021.05); *H01F 27/2823* (2013.01); *H01F 27/29* (2013.01); *H02M 3/33573* (2021.05); *H02M 3/33576* (2013.01)

(58) Field of Classification Search
CPC ............. H02M 3/003; H02M 3/33573; H02M 3/33576; H02M 1/0064; H01F 27/2823;
(Continued)

(56) References Cited

U.S. PATENT DOCUMENTS

| | | | |
|---|---|---|---|
| 8,446,244 B1 * | 5/2013 | Kuang ..................... | H01F 30/06 336/232 |
| 2007/0047266 A1 * | 3/2007 | Nakahori ................ | H02M 3/28 363/17 |

(Continued)

FOREIGN PATENT DOCUMENTS

| | | |
|---|---|---|
| JP | 2008-079375 A | 4/2008 |
| JP | 2011-082205 A | 4/2011 |

(Continued)

OTHER PUBLICATIONS

International Search Report, Application No. PCT/JP2020/029619, mailed Sep. 29, 2020. ISA/Japan Patent Office.

*Primary Examiner* — Mang Tin Bik Lian
*Assistant Examiner* — Mangtin Lian
(74) *Attorney, Agent, or Firm* — Honigman LLP

(57) ABSTRACT

A composite component includes a primary winding, a secondary winding, a coil, a first terminal, a second terminal, a third terminal, a fourth terminal, a fifth terminal, a sixth terminal, and wiring. The primary winding and the secondary winding in combination function as a transformer. The secondary winding is connected between the third terminal and the fourth terminal. The fifth terminal functions as a center tap of the secondary winding. The sixth terminal is connected to the first terminal via the wiring and the primary winding. The sixth terminal is connected to the second terminal via the wiring and the coil. A first portion of the primary winding that is connected to the wiring, a second portion of the coil that is connected to the wiring, and the wiring constitute a three-way junction.

9 Claims, 17 Drawing Sheets

(51) Int. Cl.
*H02M 3/00* (2006.01)
*H02M 3/335* (2006.01)

(58) Field of Classification Search
CPC ...... H01F 27/29; H01F 27/2847; H01F 27/38; H01F 27/40; H01F 27/306
See application file for complete search history.

(56) References Cited

U.S. PATENT DOCUMENTS

| | | | |
|---|---|---|---|
| 2008/0170418 A1* | 7/2008 | Nishiyama | H02M 3/01 363/17 |
| 2009/0289751 A1 | 11/2009 | Nagano et al. | |
| 2010/0232181 A1* | 9/2010 | Nakahori | H01F 27/2804 336/221 |
| 2010/0321960 A1* | 12/2010 | Nakahori | H02M 3/33573 363/21.04 |
| 2014/0266548 A1* | 9/2014 | Brooksbank | H01F 27/2847 336/200 |
| 2015/0102893 A1* | 4/2015 | Kawashima | H01F 27/2823 336/212 |

FOREIGN PATENT DOCUMENTS

| | | |
|---|---|---|
| JP | 2014-017978 A | 1/2014 |
| JP | 2015-192082 A | 11/2015 |
| JP | 2016-185017 A | 10/2016 |
| JP | 2017-127051 A | 7/2017 |
| JP | 2019-047018 A | 3/2019 |

* cited by examiner

COMPOSITE COMPONENT

CROSS-REFERENCE TO RELATED APPLICATIONS

This application is the U.S. national stage of PCT/JP2020/029619 filed on Aug. 3, 2020, which claims priority of Japanese Patent Application No. JP 2019-146946 filed on Aug. 9, 2019, the contents of which are incorporated herein.

TECHNICAL FIELD

The present disclosure relates to a composite component.

BACKGROUND

A phase-shift, full-bridge DC/DC converter is known. For example, a pair of clamp diodes connected in series between a high-voltage line and a low-voltage line on the primary side are adopted in JP 2017-127051A. Furthermore, two pairs of switch elements connected in series between the high-voltage line and the low-voltage line on the primary side are adopted. Furthermore, an inductor connected between a connection point between each pair of switch elements and a connection point between the pair of clamp diodes is adopted.

A device including an inductor and a transformer is known. For example, in JP 2011-82205A, a wound conductor portion of a primary coil of the transformer and a wound conductor portion of a secondary coil of the transformer are wound around a first core. The wound conductor portion of the secondary coil includes a first wound conductive wire and a second wound conductive wire. The inductor includes extended conductor portions respectively formed by extending the first wound conductive wire and the second wound conductive wire. The center tap of the inductor is connected to the secondary coil.

In a phase-shift, full-bridge DC/DC converter (hereinafter tentatively referred to as a "full-bridge converter"), one end of an inductor and one end of a primary coil of a transformer are both connected to a connection point (hereinafter tentatively referred to as a "diode connection point") between a pair of clamp diodes. To achieve this connection, it is preferable that the winding of the inductor is provided separately from the winding of the transformer. In this respect, it is not appropriate to directly use the inductor disclosed in JP 2011-82205A as the inductor of the full-bridge converter.

When conductive wires that are respectively drawn out from the inductor and the primary coil of the transformer are separately connected to the diode connection point, the leakage inductance of the transformer is substantially increased. Such an increase in the leakage inductance reduces the effect of suppressing a surge voltage generated in the full-bridge converter.

Therefore, an object of the present disclosure is to provide a composite component that is less likely to impair the effect of suppressing a surge voltage generated in a full-bridge converter.

SUMMARY

A composite component according to the present disclosure includes a primary winding, a secondary winding, a coil, a first terminal, a second terminal, a third terminal, a fourth terminal, a fifth terminal, a sixth terminal, and wiring. The primary winding and the secondary winding in combination function as a transformer. The secondary winding is connected between the third terminal and the fourth terminal. The fifth terminal functions as a center tap of the secondary winding. The sixth terminal is connected to the first terminal via the wiring and the primary winding. The sixth terminal is connected to the second terminal via the wiring and the coil. A first portion of the primary winding that is connected to the wiring, a second portion of the coil that is connected to the wiring, and the wiring constitute a three-way junction.

ADVANTAGEOUS EFFECTS OF INVENTION

With the composite component according to the present disclosure, the effect of suppressing a surge voltage generated in a full-bridge converter is less likely to be impaired.

DESCRIPTION OF EMBODIMENTS OF THE PRESENT DISCLOSURE

Figure 1:
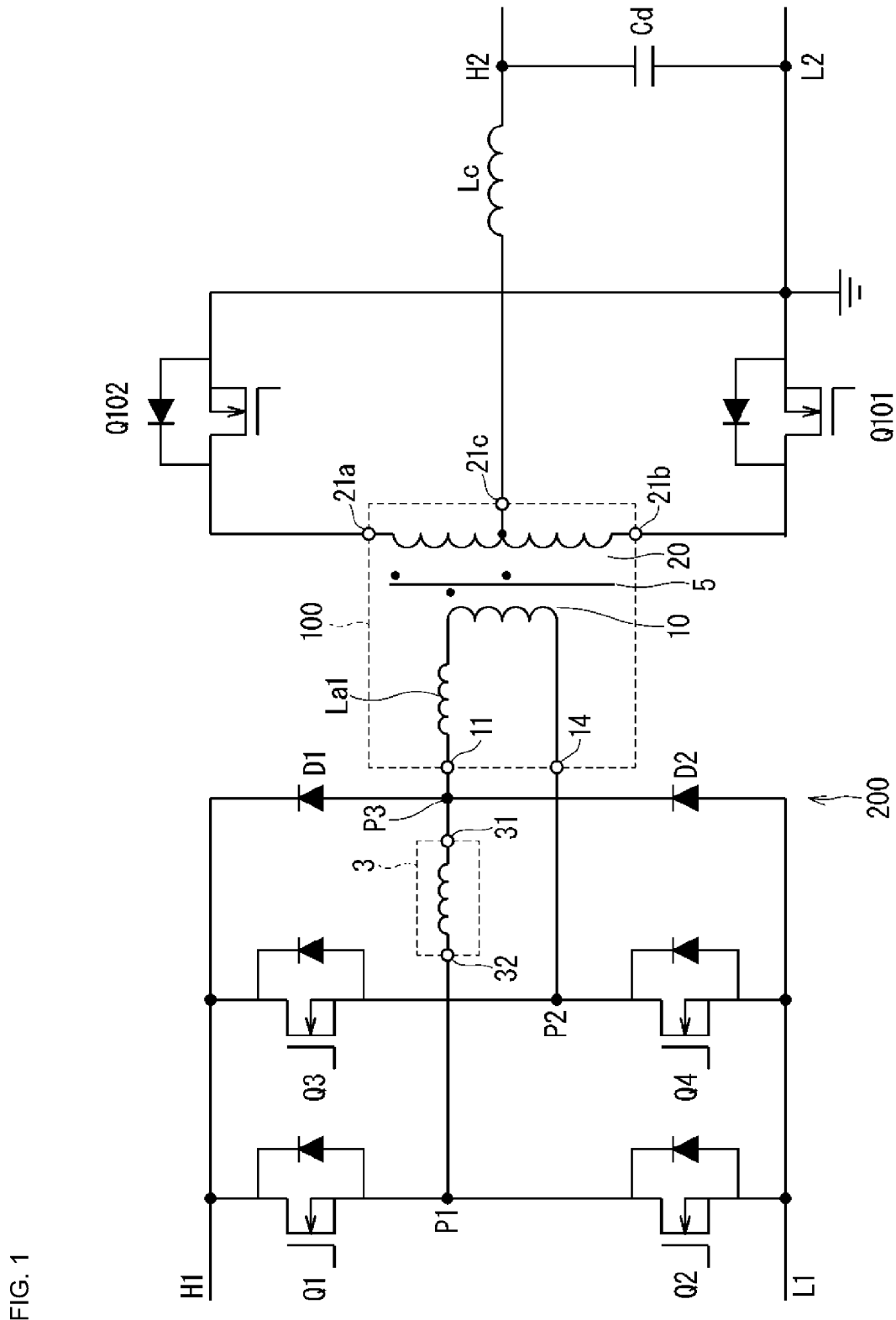
FIG. 1 is a circuit diagram illustrating a full-bridge converter.

First, aspects of the present disclosure will be listed and described. The present disclosure is as follows.

A composite component includes a primary winding, a secondary winding, a coil, a first terminal, a second terminal, a third terminal, a fourth terminal, a fifth terminal, a sixth terminal, and wiring. The primary winding and the secondary winding in combination function as a transformer. The secondary winding is connected between the third terminal and the fourth terminal. The fifth terminal functions as a center tap of the secondary winding. The sixth terminal is connected to the first terminal via the wiring and the primary winding. The sixth terminal is connected to the second terminal via the wiring and the coil. A first portion of the primary winding that is connected to the wiring, a second portion of the coil that is connected to the wiring, and the wiring constitute a three-way junction.

In a full-bridge converter, when a change occurs from a first state in which the voltage of the transformer on the primary side is very low, to a second state in which the voltage of the transformer on the primary side is high, no current flows through the wiring. Therefore, the inductance of the wiring does not affect the surge voltage. Since the inductance of the first portion is reduced, the effect of suppressing the surge voltage is less likely to be impaired.

It is preferable that each of the primary winding, the secondary winding, and the coil is wound with a first direction serving as an axial direction, the primary winding and the coil are disposed adjacent to each other in a second direction, and the second direction is different from the first direction.

Since the primary winding and the coil can be disposed at substantially the same position in the first direction, the composite component can be formed flat, and hence compact.

It is preferable that the sixth terminal is located away from the primary winding and the coil along a third direction, the third direction is nonparallel to a plane determined by the first direction and the second direction, and each of a direction in which the primary winding is wound relative to the first direction as the primary winding extends from the first terminal toward the first portion, and a direction in which the coil is wound relative to the first direction as the coil extends from the second terminal toward the second portion is one of two rotation directions as viewed along the first direction, the rotation direction having a larger rotation angle required to reach the third direction from the second direction. The reason being that the ratio of the inductance contributing to suppression of the surge voltage is likely to be set large.

It is preferable that a portion of the primary winding that includes at least the first portion, a portion of the coil that includes at least the second portion, and the wiring are formed of a monolithic steel plate. The reason being that the three-way junction can be easily formed.

It is preferable that the primary winding is formed of a first flat rectangular wire, and the coil is formed of a second flat rectangular wire, and the second portion of the second flat rectangular wire is connected to the first flat rectangular wire in the first direction, with the first flat rectangular wire including the first portion and the wiring, or the first portion of the first flat rectangular wire is connected to the second flat rectangular wire in the first direction, with the second flat rectangular wire including the second portion and the wiring. The reason being that a multi-layer primary winding and a multi-layer coil can be easily formed.

Specific examples of a composite component according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Description of Full-Bridge Converter

FIG. 1 is a circuit diagram illustrating a converter 200 that employs a transformer 100 and an inductor 3. The converter 200 is a full-bridge converter.

Terminals 11 and 14 of the transformer 100 function as primary-side terminals of the transformer 100. A primary winding 10 of the transformer 100 is connected between the terminals 11 and 14. Note that an inductor La1 illustrated as being located between the terminal 11 and the primary winding 10 inside the transformer 100 equivalently indicates the leakage inductance of the transformer 100 on the primary side. In the following, for the sake of convenience, the primary winding 10 and the terminals 11 and 14 may be collectively referred to as a primary-side structure 1.

Terminals 21a, 21b, and 21c of the transformer 100 function as secondary-side terminals of the transformer 100. A secondary winding 20 of the transformer 100 is connected between the terminal 21a and the terminal 21b. The terminal 21c functions as a center tap of the secondary winding 20. In the following, for the sake of convenience, the secondary winding 20 and the terminals 21a, 21b, and 21c may be collectively referred to as a secondary-side structure 2.

Switching elements Q1, Q2, Q3, and Q4 and diodes D1 and D2 are provided between power lines H1 and L1 on the primary side of the transformer 100. The power line H1 has a potential that is higher than that of the power line L1.

The switching elements Q1, Q2, Q3, and Q4 correspond to the above-described two pairs of switch elements. The diodes D1 and D2 correspond to the above-described pair of clamp diodes. The power line H1 corresponds to the above-described high-voltage line. The power line L1 corresponds to the above-described low-voltage line.

The switching elements Q1 and Q2 are connected in series between the power lines H1 and L1 via a connection point P1. The switching elements Q3 and Q4 are connected in series between the power lines H1 and L1 via a connection point P2.

The cathode of the diode D1 is connected to the power line H1. The anode of the diode D2 is connected to the power line L1. The diodes D1 and D2 are connected in series between the power lines H1 and L1 via a connection point P3. The anode of the diode D1 and the cathode of the diode D2 are connected to the terminal 11 via the connection point P3. The connection point P3 corresponds to the above-described diode connection point. The terminal 11 can be used as the connection point P3.

The connection point P3 is connected to the connection point P1 via an inductor 3. A terminal 32 of the inductor 3 is connected to the connection point P1. A terminal 31 of the inductor 3 is connected to the connection point P3. The terminal 14 is connected to the connection point P2. The terminal 14 can be used as the connection point P2.

Switching elements Q101 and Q102, an inductor Lc, and a capacitor Cd are provided on the secondary side of the transformer 100. The capacitor Cd is provided between power lines H2 and L2. The power line H2 has a potential that is higher than that of the power line L2. The power line L2 is grounded, for example.

One end of the switching element Q101 is connected to the terminal 21b, and the other end thereof is connected to the power line L2. One end of the switching element Q102 is connected to the terminal 21a, and the other end thereof is connected to the power line L2. One end of the inductor Lc is connected to the terminal 21c, and the other end thereof is connected to the power line H2.

All of the switching elements Q1, Q2, Q3, Q4, Q101, and Q102 are realized by a field-effect transistor, for example.

Since the operations of the converter 200 having the above-described configuration, including, for example, the timing at which the switching elements Q1, Q2, Q3, Q4, Q101, and Q102 are switched, are known, descriptions of the operations are omitted in the present embodiment. A description will be given of the benefit of reducing the leakage inductance on the primary side of the transformer 100.

The inductor 3 has the function of reducing the surge voltage on the secondary side of the converter 200. Energy is regenerated to the power lines H1 and L1 via the diodes D1 and D2.

The larger the ratio of the inductance (hereinafter referred to as an "inductance Lb") of the inductor 3 to the leakage inductance, the greater the effect of reducing the surge voltage on the secondary side is. The sum of the inductance Lb and the leakage inductance affects the resonant period of so-called soft switching. In view of this effect, it is not desirable to increase the inductance Lb without limitation. Therefore, it is desirable that leakage inductance is small.

DESCRIPTION OF COMPARATIVE EXAMPLE

Figure 2:
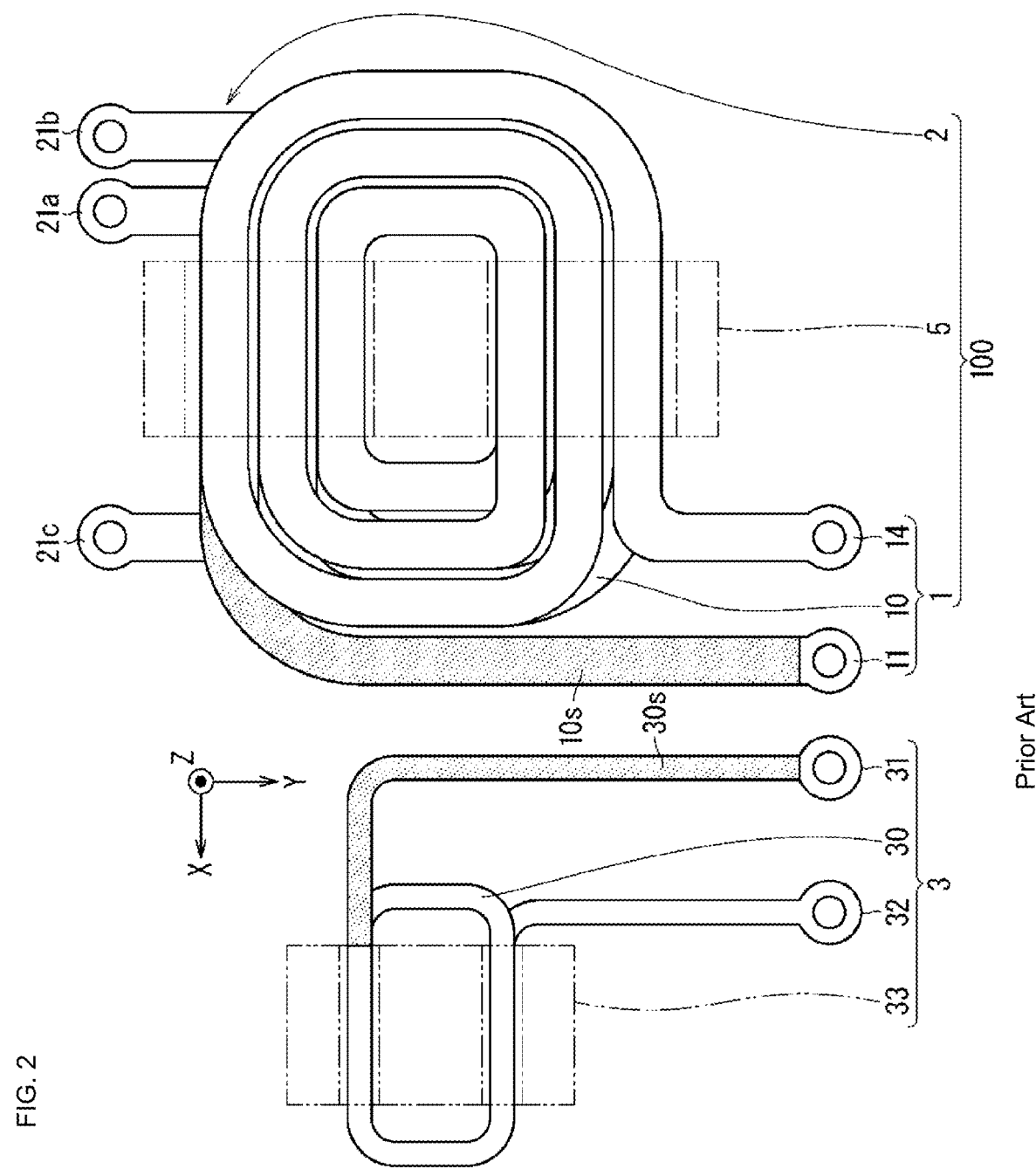
FIG. 2 is a plan view showing a transformer and an inductor in a comparative example.
Figure 3:
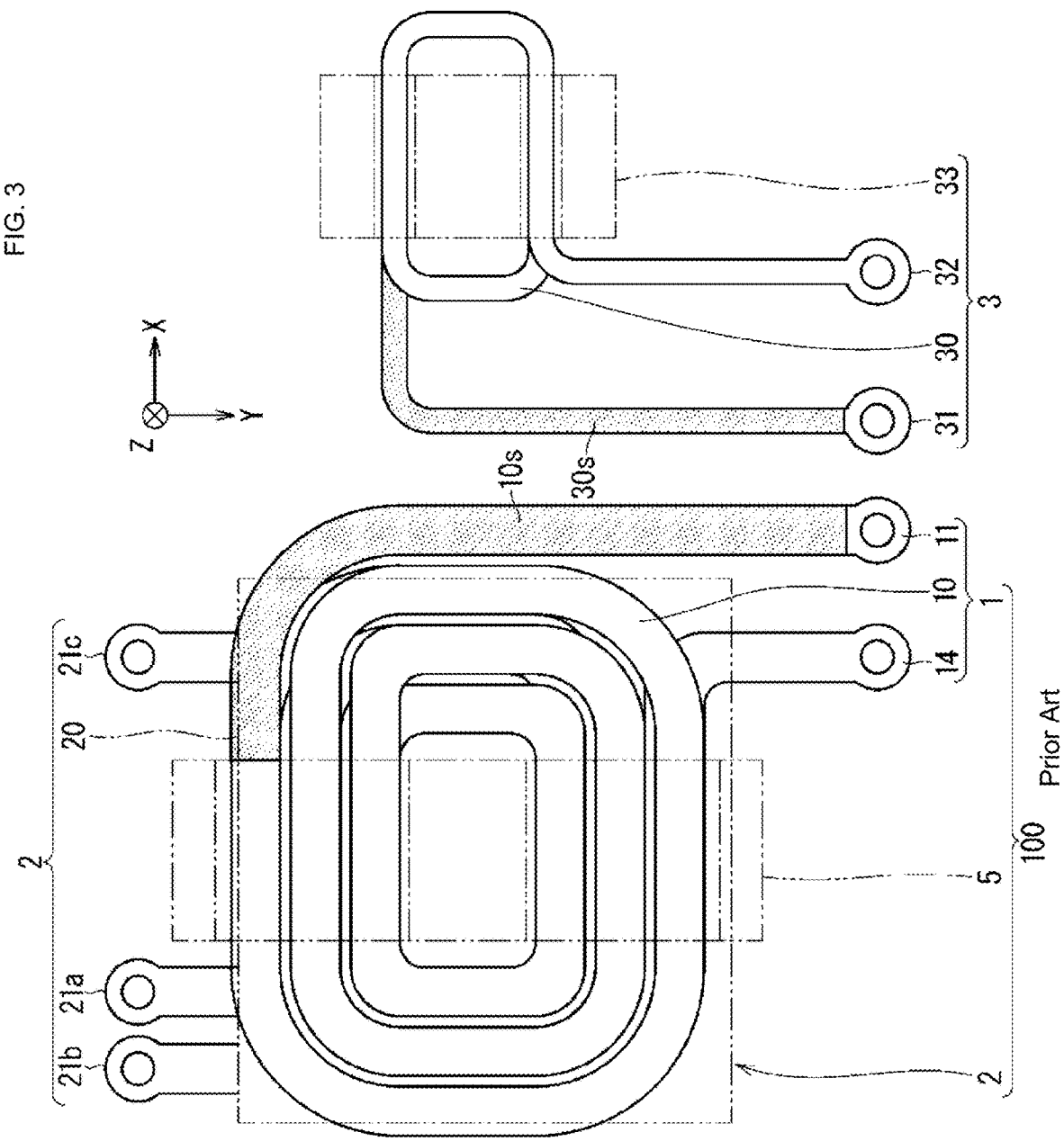
FIG. 3 is a plan view showing the transformer and the inductor in the comparative example.

FIGS. 2 and 3 are plan views showing a transformer 100 and an inductor 3 in a comparative example. In the comparative example, the transformer 100 and the inductor 3 are provided separate from each other.

The transformer 100 includes a core 5. The primary winding 10 and the secondary winding 20 are wound around the core 5. The axial direction of this winding is shown as the Z direction in the drawings. To keep the drawing from becoming complex, the core 5 is indicated by a dashed double-dotted line indicating its position in FIGS. 2 and 3. The core 5 is an EI-type core, for example. To keep the drawing from becoming complex, the secondary winding 20 is not shown in FIG. 2, and is indicated by a dashed double-dotted line indicating its position in FIG. 3. The primary winding 10 and the secondary winding 20 are coupled to each other with the same polarity via the core 5.

The inductor 3 includes a coil 30, terminals 31 and 32, and a core 33. The coil 30 is connected between the terminals 31 and 32. The coil 30 is wound around the core 33. The axial direction of this winding is shown as the Z direction in the drawings. To keep the drawing from becoming complex, the core 33 is indicated by a dashed double-dotted line indicating its position in FIGS. 2 and 3. The core 33 is an EI-type core, for example.

A direction extending from the transformer 100 toward the inductor 3 is shown as the X direction in the drawings. Here, a case is illustrated where the X direction is orthogonal to the Z direction. In FIGS. 2 and 3, a case is illustrated where the Y direction is orthogonal to both the X direction and the Z direction. As viewed along the Z direction, the Y direction can be reached clockwise with an angle of less than n radian from the X direction. That is, so-called right-handed orthogonal directions are adopted for the X direction, the Y direction, and the Z direction in this order. The right-handed orthogonal directions are commonly adopted for all of the embodiments described below.

A case is illustrated where the terminals 11 and 14 are disposed on the Y-direction side of the primary-side structure 1, as viewed from the primary winding 10. A case is illustrated where the terminals 31 and 32 are disposed on the Y-direction side of the inductor 3, as viewed from the coil 30.

The primary winding 10 has a first portion 10s on the terminal 11 side. The first portion 10s is shown with dot hatching in order to indicate its position. The first portion 10s is a portion of the primary winding 10, but is not surrounded by the core 5, and does not connect portions of the primary winding 10 that are surrounded by the core 5. Accordingly, the first portion 10s functions as wiring without being coupled to the secondary winding 20.

The coil 30 has a second portion 30s on the terminal 31 side thereof. The second portion 30s is shown with dot hatching in order to indicate its position. The second portion 30s is a portion of the coil 30, but is not surrounded by the core 33, and does not connect portions of the coil 30 that are surrounded by the core 33. Accordingly, the second portion 30s functions as wiring.

Figure 4:
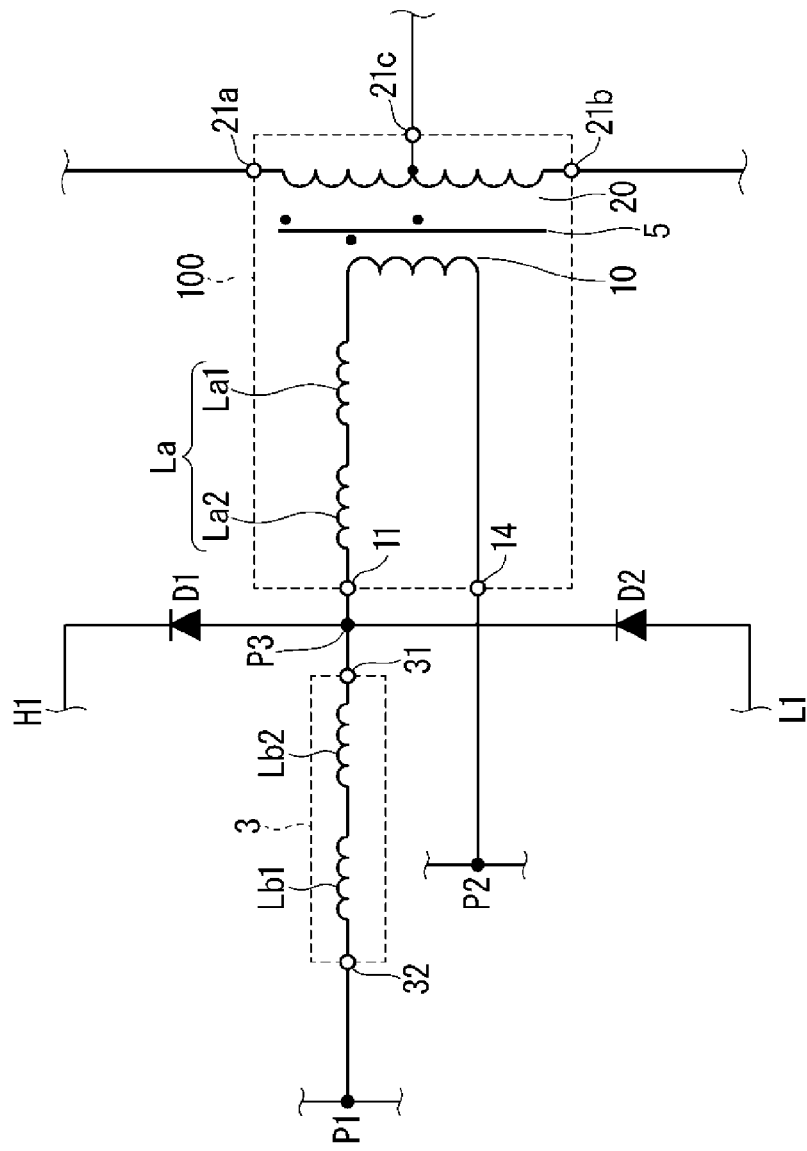
FIG. 4 is a circuit diagram of a full-bridge converter when the comparative example is adopted.

FIG. 4 is a circuit diagram of a full-bridge converter when the transformer 100 and the inductor 3 illustrated in FIGS. 2 and 3 are adopted. Note that portions that are not necessary for the following description are omitted, and only the transformer 100 and the inductor 3, as well as the vicinity thereof are shown.

The inductor La is shown separated into the inductors La1 and La2. Although the first portion 10s constitutes a portion of the primary winding 10, the inductance of the first portion 10s is equivalently represented by the inductor La2. The inductor La2 is located in series with the inductor La1 between the terminal 11 and the primary winding 10. Accordingly, the first portion 10s equivalently increases the leakage inductance of the transformer 100. The inductor La indicates the leakage inductance of the transformer 100, taking the first portion 10s into account.

A portion that is not surrounded by the core 5, and that does not connect portions of the primary winding 10 that are surrounded by the core 5 is present on the terminal 14 side of the primary winding 10. This portion is not particularly related to the following description, and therefore the inductance of this portion is considered as being included in the inductor La1.

Although the second portion 30s constitutes a portion of the coil 30, the inductance of the second portion 30s is equivalently represented by the inductor Lb2. The inductor Lb1 equivalently represents the inductance of portions of the coil 30 other than the second portion 30s. The inductors Lb1 and Lb2 are connected in series between the terminals 31 and 32. The inductance Lb is an inductance obtained by combining the inductors Lb1 and Lb2.

A portion that is not surrounded by the core 33, and that does not connect portions of the coil 30 that are surrounded by the core 33 is present on the terminal 32 side of the coil 30. This portion is not particularly related to the following description, and therefore the inductance of this portion is considered as being included in the inductor Lb1.

The first portion 10s effectively increases the leakage inductance of the transformer 100, thus impairing the effect of reducing the surge voltage using the inductor 3.

Let us assume that a change occurs from a first state in which the voltage of the transformer 100 on the primary side is very low (0 V when the on-resistances of the switching elements Q1, Q2, Q3, and Q4 are ignored) to a second state in which the voltage of the transformer 100 on the primary side is high (the voltage across the power lines H1 and L1 when the on-resistances of the switching elements Q1, Q2, Q3, and Q4 are ignored). Due to a current flowing in the first state through the inductors Lb1, Lb2, La1, and La1 that are connected in series with each other between the connection points P1 and P2, a capacitance parasitic on the switching elements Q101 and Q102 provided on the secondary side of the transformer 100 is charged.

This charging causes a surge voltage, and the larger the inductance combined in the inductors Lb1, Lb2, La1, and La1 is, the more significant the surge voltage is.

First Embodiment

Figure 5:
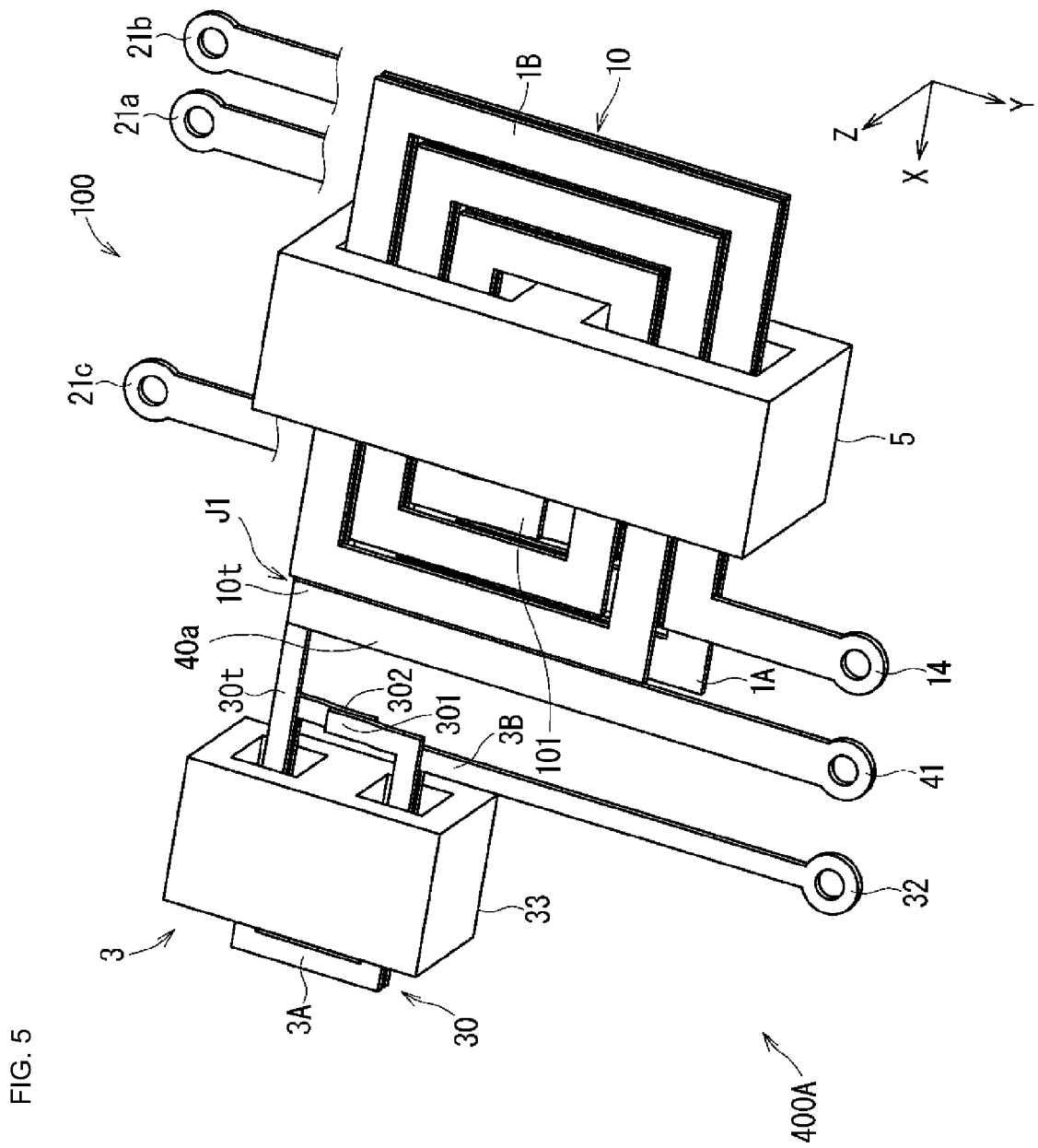
FIG. 5 is a perspective view illustrating a composite component according to a first embodiment.
Figure 6:
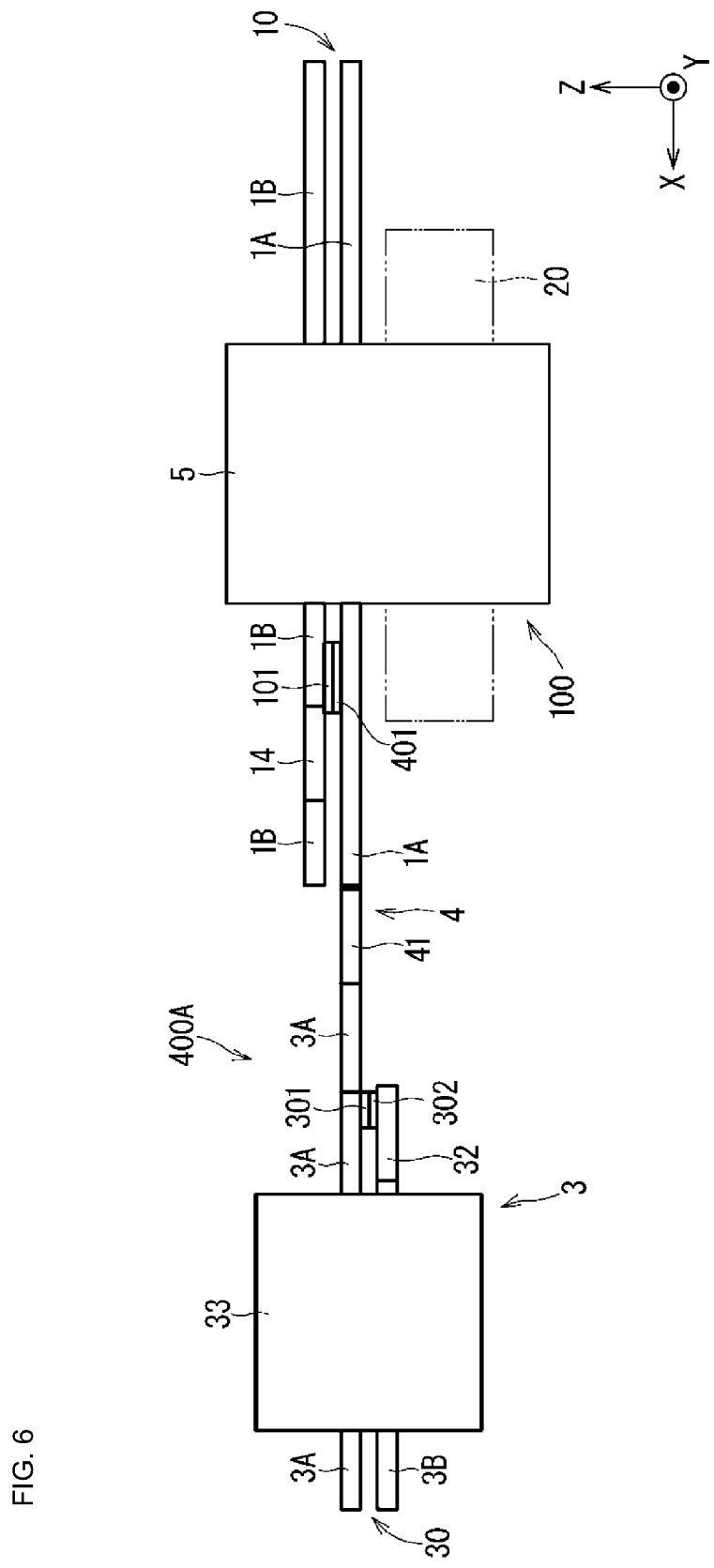
FIG. 6 is a side view illustrating the composite component according to the first embodiment.

FIG. 5 is a perspective view illustrating a composite component 400A according to a first embodiment. FIG. 6 is a side view illustrating the composite component 400A. The composite component 400A includes a transformer 100 and an inductor 3. A direction extending from the transformer 100 toward the inductor 3 is shown as the X direction in the drawings.

The primary winding 10 and the secondary winding 20 are wound around the core 5. The axial direction of this winding is shown as the Z direction in the drawings. The core 5 is an EI-type core, for example. To keep the drawing from becoming complex, the secondary winding 20 is not shown in FIG. 5, and is indicated by a dashed double-dotted line indicating its position in FIG. 6. The primary winding 10 and the secondary winding 20 are coupled to each other with the same polarity via the core 5, and in combination function as the transformer 100.

Terminals 21a, 21b, and 21c function as secondary-side terminals of the transformer 100. The secondary winding 20 is connected between the terminal 21a and the terminal 21b. The terminal 21c functions as a center tap of the secondary winding 20.

The inductor 3 includes a coil 30, a terminal 32, and a core 33. The coil 30 is wound around the core 33. The axial direction of this winding is shown as the Z direction in the drawings. The core 33 is an EI-type core, for example.

Figure 7:
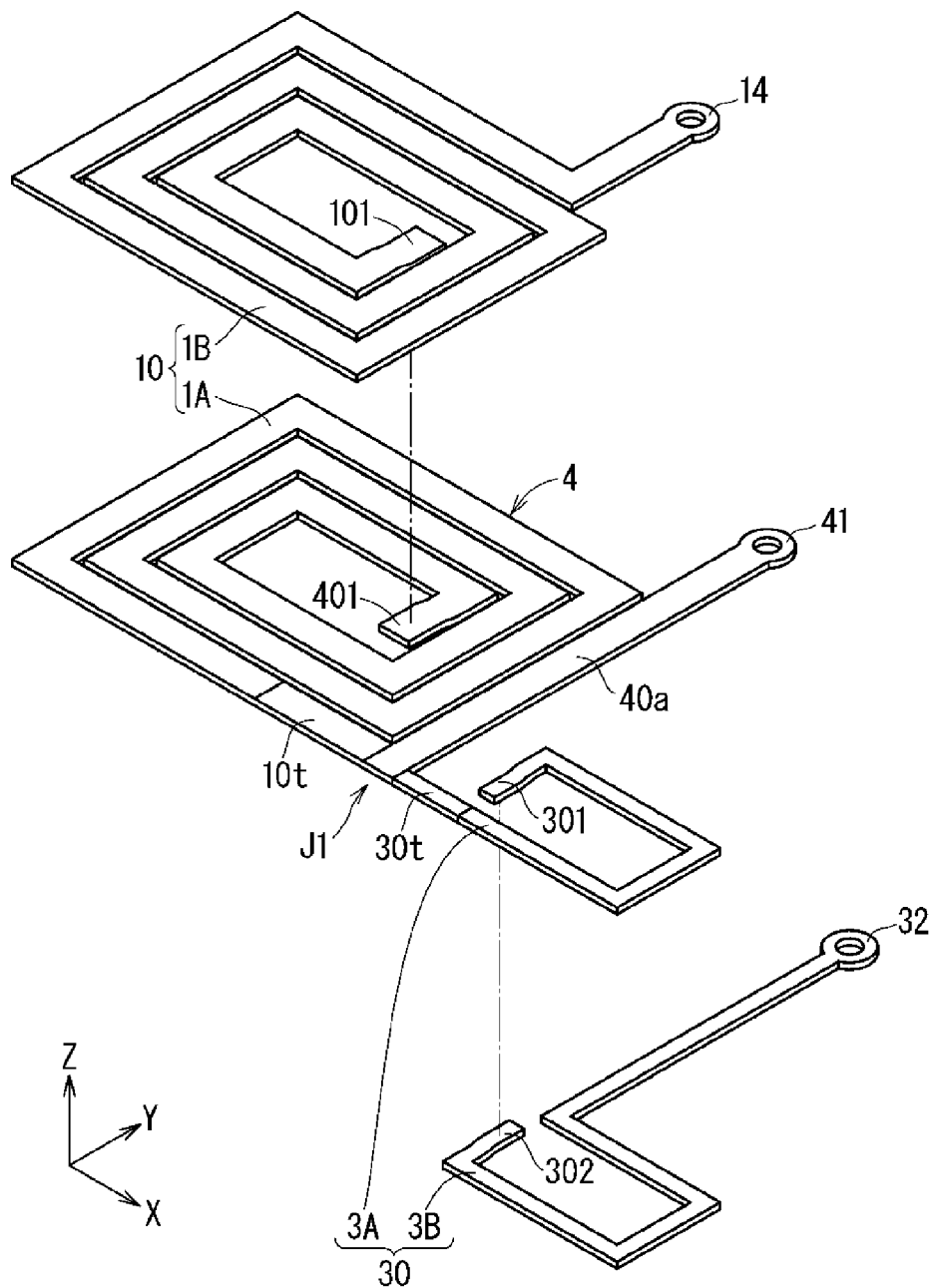
FIG. 7 is a perspective view showing parts of the composite component according to the first embodiment, with intervals therebetween widened along one direction.

FIG. 7 is a perspective view showing parts of the composite component 400A, specifically, a structure from which the cores 5 and 33 are omitted, with intervals therebetween widened along the Z direction. Each of the two dashed dotted lines extending along the Z direction connects two portions connected in the Z direction.

The primary winding 10 includes a first layer 1A and a second layer 1B. The first layer 1A and the second layer 1B are located so as to be arranged in this order along the Z direction. The first layer 1A has a first portion 10t and a connection portion 401. The first layer 1A is wound counterclockwise around the core 5 as viewed along the Z direction as the first layer 1A extends from the first portion 10t toward the connection portion 401.

The first portion 10t is a portion of the primary winding 10, but is not surrounded by the core 5, and does not connect portions of the primary winding 10 that are surrounded by the core 5. Accordingly, the first portion 10t functions as wiring without being coupled to the secondary winding 20. The first portion 10t forms a three-way junction J1 together with a second portion 30t and wiring 40a, which will be described below. In the drawings, the boundary of the first portion 10t is virtually shown.

The second layer 1B has a connection portion 101, and is connected to the terminal 14 on the side opposite to the connection portion 101. In the first embodiment, the connection between the second layer 1B and the terminal 14 is achieved by forming the second layer 1B and the terminal 14 as one piece. The second layer 1B is wound counterclockwise around the core 5 as viewed along the Z direction as the second layer 1B extends from the connection portion 101 toward the terminal 14.

The connection portion 401 is inclined or protrudes toward the Z direction relative to portions of the first layer 1A other than the connection portion 401. The connection portion 101 is inclined or protrudes toward the side opposite to the Z direction relative to portions of the second layer 1B other than the connection portion 101. The connection portion 101 of the first layer 1A and the connection portion 401 of the second layer 1B are connected to each other in the Z direction. The first layer 1A and the second layer 1B are not in contact with each other at portions other than the connection portions 101 and 401. The primary winding 10 includes the first layer 1A and the second layer 1B. Accordingly, the primary winding 10 is wound counterclockwise around the core 5 as viewed along the Z direction as the primary winding 10 extends from the first portion 10t toward the terminal 14.

The coil 30 includes a first layer 3A and a second layer 3B. The second layer 3B and the first layer 3A are located so as to be arranged in this order along the Z direction. The first layer 3A has a second portion 30t and a connection portion 301. The first layer 3A is wound clockwise around the core 33 as viewed along the Z direction as the first layer 3A extends from the second portion 30t toward the connection portion 301.

The second portion 30t is a portion of the coil 30, but is not surrounded by the core 33, and does not connect portions of the coil 30 that are surrounded by the core 33. Accordingly, the second portion 30t functions as wiring. The second portion 30t forms a three-way junction J1 together with the first portion 10t and wiring 40a, which will be described below. In the drawings, the boundary of the second portion 30t is virtually shown.

The second layer 3B has a connection portion 302, and is connected to the terminal 32 on the side opposite to the connection portion 302. In the first embodiment, the connection between the second layer 3B and the terminal 32 is achieved by forming the second layer 3B and the terminal 32 as one piece. The second layer 3B is wound clockwise around the core 33 as viewed along the Z direction as the second layer 3B extends from the connection portion 302 toward the terminal 32.

The connection portion 302 is inclined or protrudes toward the Z direction relative to portions of the second layer 3B other than the connection portion 302. The connection portion 301 is inclined or protrudes toward the side opposite to the Z direction side relative to portions of the first layer 3A other than the connection portion 301. The connection portion 301 of the first layer 3A and the connection portion 302 of the second layer 3B are connected to each other in the Z direction. The first layer 3A and the second layer 3B are not in contact with each other at portions other than the connection portions 301 and 302. The coil 30 includes the first layer 3A and the second layer 3B. Accordingly, the coil 30 is wound clockwise around the core 33 as viewed along the Z direction as the coil 30 extends from the second portion 30t toward the terminal 32.

The conductor 4 includes first layers 1A and 3A, wiring 40a, and a terminal 41. The wiring 40a forms the three-way junction J1 together with the first portion 10t and the second portion 30t. In FIGS. 5, 6 and 7, a case is illustrated where the wiring 40a extends in the Y direction toward the terminal 41, the first portion 10t extends in the X direction toward the wiring 40a, and the second portion 30t extends in a direction opposite to the X direction toward the wiring 40a. In the drawings, the boundary of the wiring 40a is virtually shown.

A case is illustrated where the terminal 14 is disposed on the Y-direction side as viewed from the second layer 1B. A case is illustrated where the terminal 41 is disposed on the Y-direction side as viewed from the first layers 1A and 3A. A case is illustrated where the terminal 32 is disposed on the Y-direction side as viewed from the second layer 3B. A case is illustrated where the terminals 14 and 41 are disposed on the Y-direction side as viewed from the primary winding 10. A case is illustrated where the terminals 32 and 41 are disposed on the Y-direction side as viewed from the coil 30.

All of the second layers 1B and 3B, and the conductor 4 can be implemented using a monolithic steel plate obtained through punching, for example. It is advantageous to adopt a monolithic steel plate for a portion of the primary winding 10 that includes at least the first portion 10t, a portion of the coil 30 that includes at least the second portion 30t, and the wiring 40a, because the three-way junction J1 can be easily formed.

The connection between the connection portions 301 and 302 in the Z direction, and the connection between the connection portions 101 and 401 in the Z direction can both be realized through crimping, soldering, or welding, for example.

The composite component 400A can be described as follows. The composite component 400A includes a primary winding 10, a secondary winding 20, a coil 30, a first terminal 14, a second terminal 32, a third terminal 21a, a fourth terminal 21b, a fifth terminal 21c, a sixth terminal 41, and wiring 40a. The primary winding 10 and the secondary winding 20 in combination function as a transformer 100.

The secondary winding 20 is connected between the third terminal 21a and the fourth terminal 21b. The fifth terminal 21c functions as a center tap of the secondary winding 20.

The sixth terminal 41 is connected to the first terminal 14 via the wiring 40a and the primary winding 10. The sixth terminal 41 is connected to the second terminal 32 via the wiring 40a and the coil 30.

A first portion 10t of the primary winding 10 that is connected to the wiring 40a, a second portion 30t of the coil 30 that is connected to the wiring 40a, and the wiring 40a constitute a three-way junction J1.

Each of the primary winding 10, the secondary winding 20, and the coil 30 is wound with the Z direction serving as the axial direction. The primary winding 10 and the coil 30 are disposed adjacent to each other in the X direction, which is different from the Z direction. By adopting such an arrangement, the primary winding 10 and the coil 30 can be disposed at substantially the same position in the Z direction. Accordingly, the composite component 400A can be formed flat, and hence compact. In the above-described example, the X direction is orthogonal to the Z direction.

Figure 8:
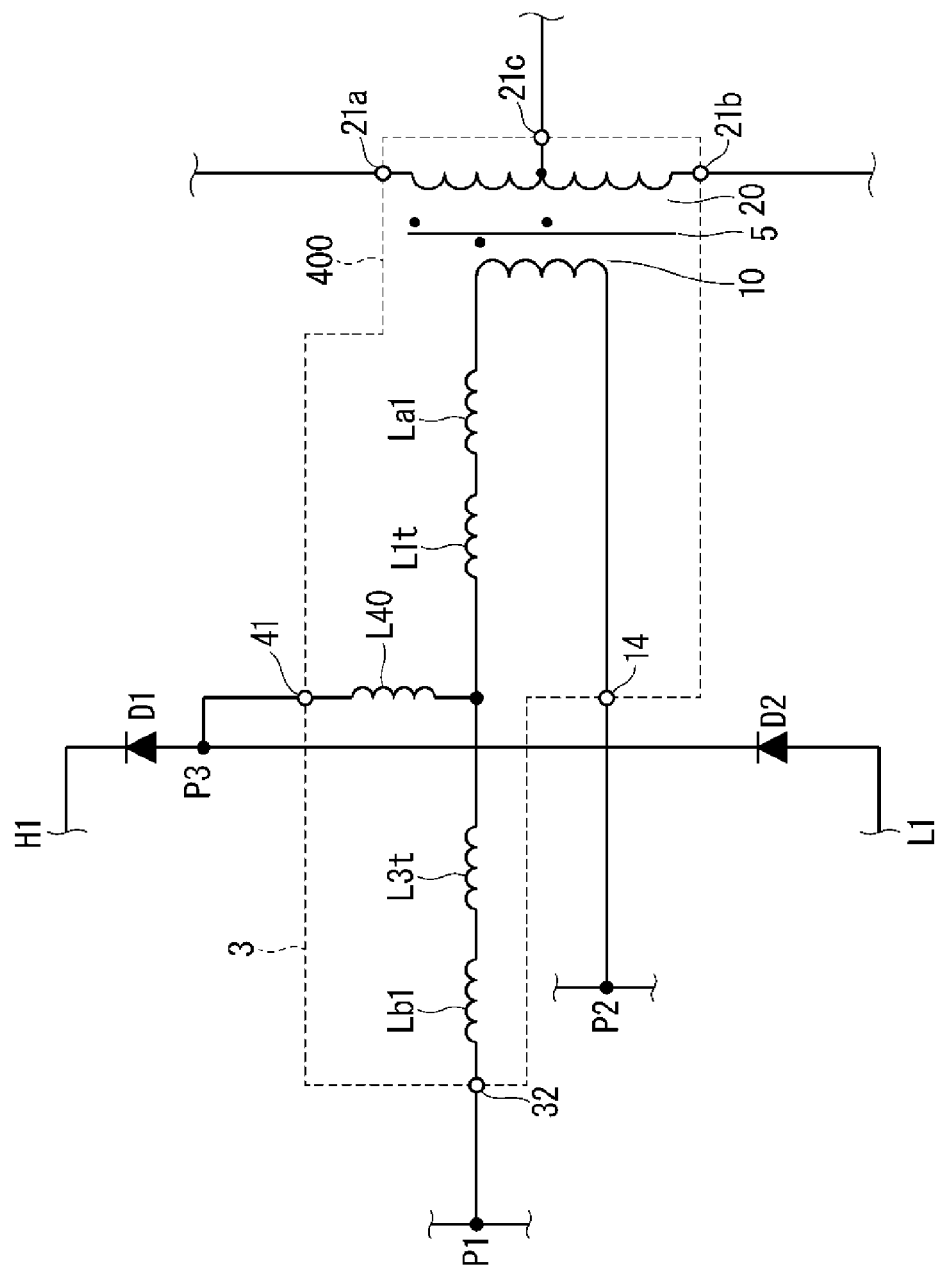
FIG. 8 is a circuit diagram of a full-bridge converter when each of the composite components according to the first embodiment, a second embodiment, a third embodiment, and a fourth embodiment is adopted.

FIG. 8 is a circuit diagram of a full-bridge converter when the composite component 400A according to the first embodiment is adopted in place of the transformer 100 and the inductor 3 shown in FIG. 4. Note that portions that are not necessary for the following description are omitted, and only the composite component 400A and the vicinity of thereof are shown.

The inductor La1 equivalently indicates the leakage inductance of the transformer 100. The inductor L1t equivalently indicates the inductance of the first portion 10t. A portion that is not surrounded by the core 5, and that does not connect portions of the primary winding 10 that are surrounded by the core 5 is present on the terminal 14 side of the primary winding 10. This portion is not particularly related to the following description, and therefore the inductance of this portion is considered as being included in the inductor La1.

The inductor L3t equivalently indicates the inductance of the second portion 30t. The inductor Lb1 equivalently represents the inductance of portions of the coil 30 other than the second portion 30t. A portion that is not surrounded by the core 33, and that does not connect portions of the coil 30 that are surrounded by the core 33 is present on the terminal 32 side of the coil 30. This portion is not particularly related to the following description, and therefore the inductance of this portion is considered as being included in the inductor Lb1.

The inductor L40 indicates the inductance of the wiring 40a. Since the wiring 40a, the first portion 10t, and the second portion 30t constitute the three-way junction J1, one end of the inductor L40, one end of the inductor L3t, and one end of the inductor L1t are shown connected to form a Y shape or a T shape. The configuration of such a Y-shape or T-shape connection is the same as that of a star connection in a three-phase alternating-current circuit.

Since the wiring 40a is located between the three-way junction J1 and the terminal 41, the other end of the inductor L40 is shown connected to the terminal 41. Since the first portion 10t is located on the side of the primary winding 10 that is closer to the wiring 40a, the other end of the inductor L1t is shown connected to the inductor La1. Since the second portion 30t is located on the side of the coil 30 that is closer to the wiring 40a, the other end of the inductor L3t is shown connected to the inductor Lb1.

In the composite component 400A, the inductors Lb1, Lb2, La2, and La1 of the comparative example correspond to the inductors Lb1, L3t, L1t, and La1, respectively. No current flows through the inductor L40 during a transition from the first state to the second state. The inductance of the inductor L40 does not affect the surge voltage.

In the above-described comparative example, the inductor La2 that equivalently indicates the inductance of the first portion 10s, and the inductor Lb2 that equivalently indicates the inductance of the second portion 30s both contribute to the above-described surge voltage.

The first portion 10t of the composite component 400A is shorter than the first portion 10s of the comparative example, and La2>L1t holds true. The second portion 30t of the composite component 400A is shorter than the second portion 30s of the comparative example, and Lb2>L3t holds true. Accordingly, the inductance affecting the above-described surge voltage and the surge voltage are both smaller in the composite component 400A than those in the comparative example. Therefore, the composite component 400A is less likely to impair the effect of suppressing the surge voltage, as compared with the comparative example.

Second Embodiment

Figure 9:
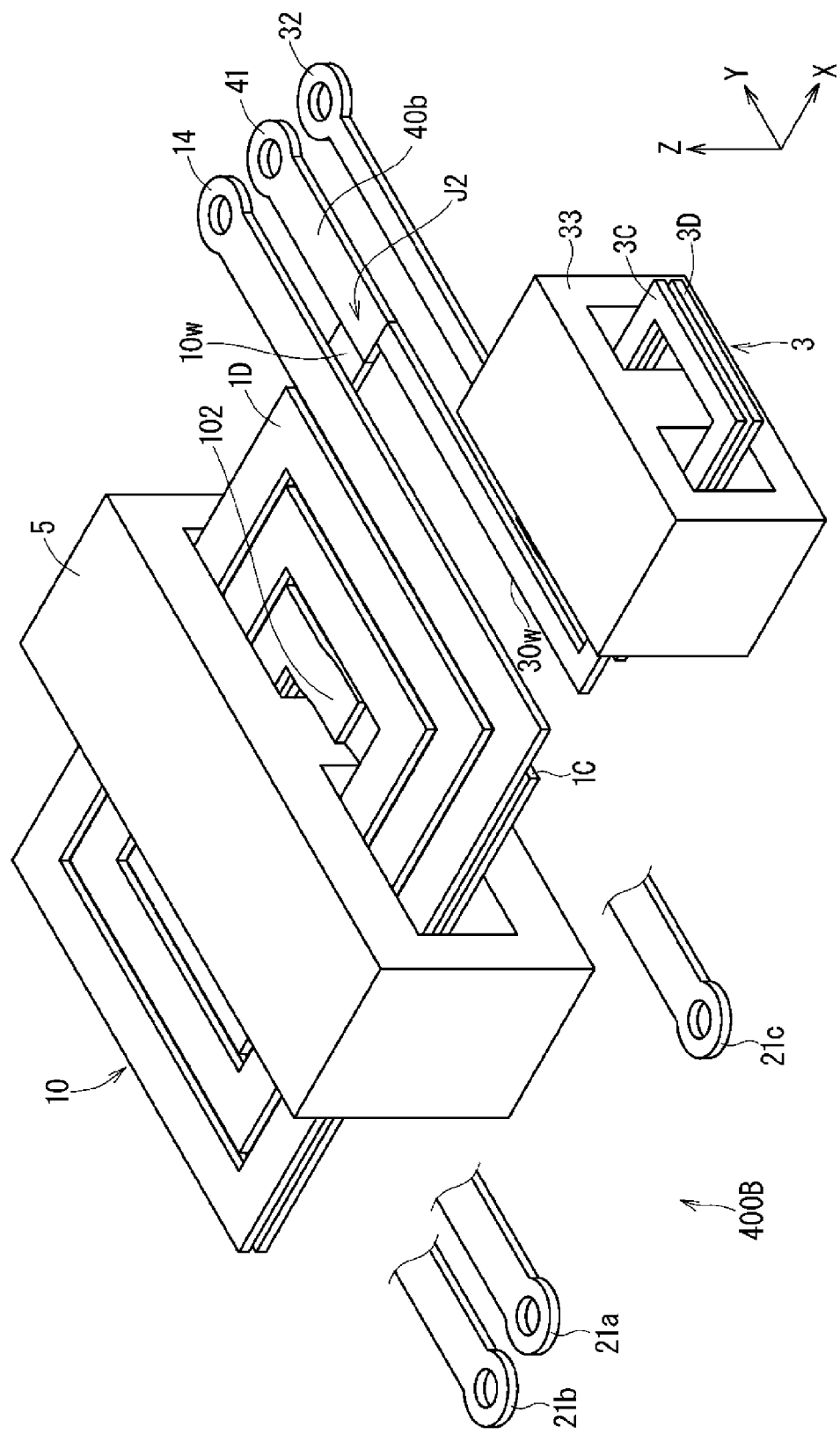
FIG. 9 is a perspective view illustrating the composite component according to the second embodiment.
Figure 10:
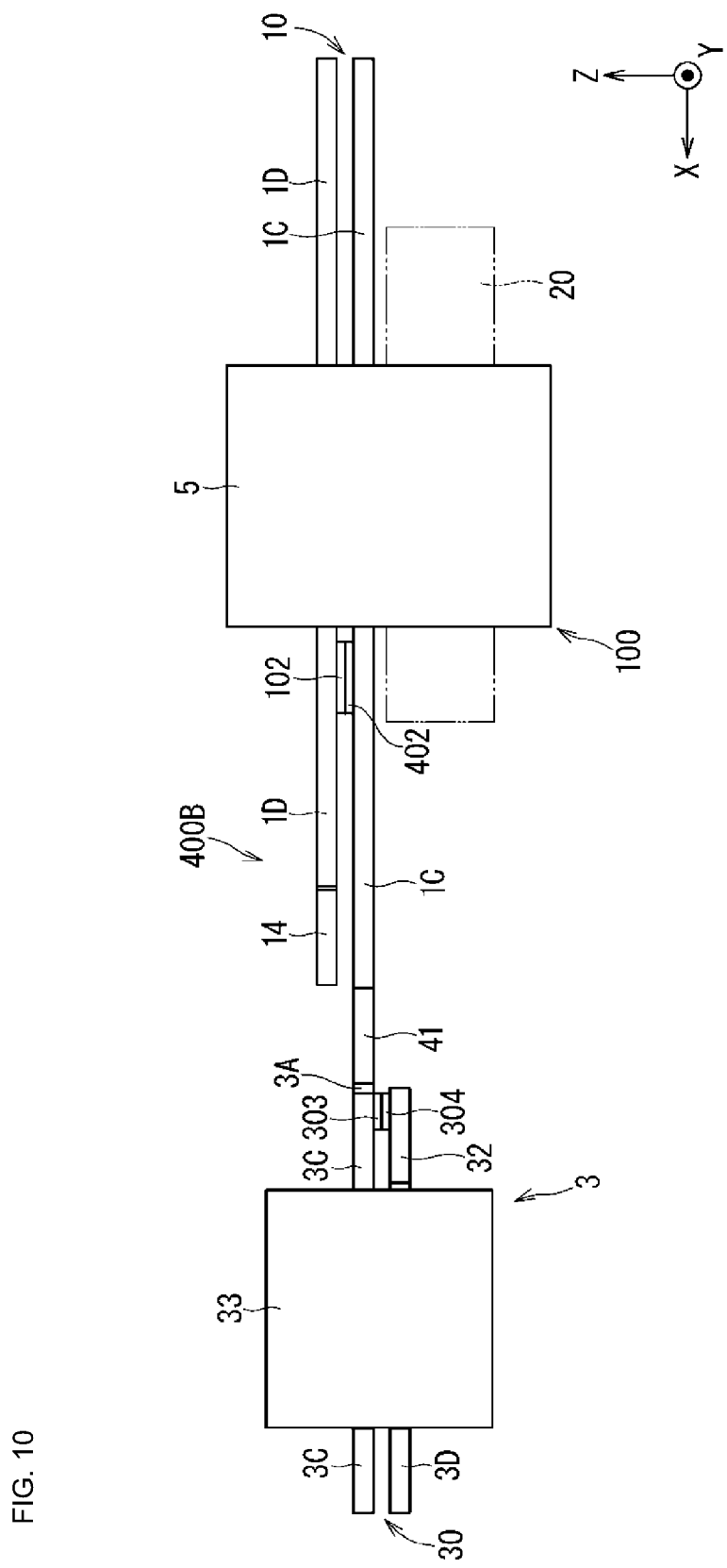
FIG. 10 is a side view illustrating the composite component according to the second embodiment.

FIG. 9 is a perspective view illustrating a composite component 400B according to the second embodiment. FIG. 10 is a side view illustrating the composite component 400B. The composite component 400B includes a transformer 100 and an inductor 3. A direction extending from the transformer 100 toward the inductor 3 is shown as the X direction in the drawing.

A primary winding 10 and a secondary winding 20 are wound around a core 5. The axial direction of this winding is shown as the Z direction in the drawings. The core 5 is an EI-type core, for example. To keep the drawing from becoming complex, the secondary winding 20 is not shown in FIG. 9, and is indicated by a dashed double-dotted line indicating its position in FIG. 10. The primary winding 10 and the secondary winding 20 are coupled to each other with the same polarity via the core 5, and in combination function as the transformer 100.

Terminals 21a, 21b, and 21c function as secondary-side terminals of the transformer 100. The secondary winding 20 is connected between the terminal 21a and the terminal 21b. The terminal 21c functions as a center tap of the secondary winding 20.

The inductor 3 includes a coil 30, a terminal 32, and a core 33. The coil 30 is wound around the core 33. The axial direction of this winding is shown as the Z direction in the drawings. The core 33 is an EI-type core, for example.

Figure 11:
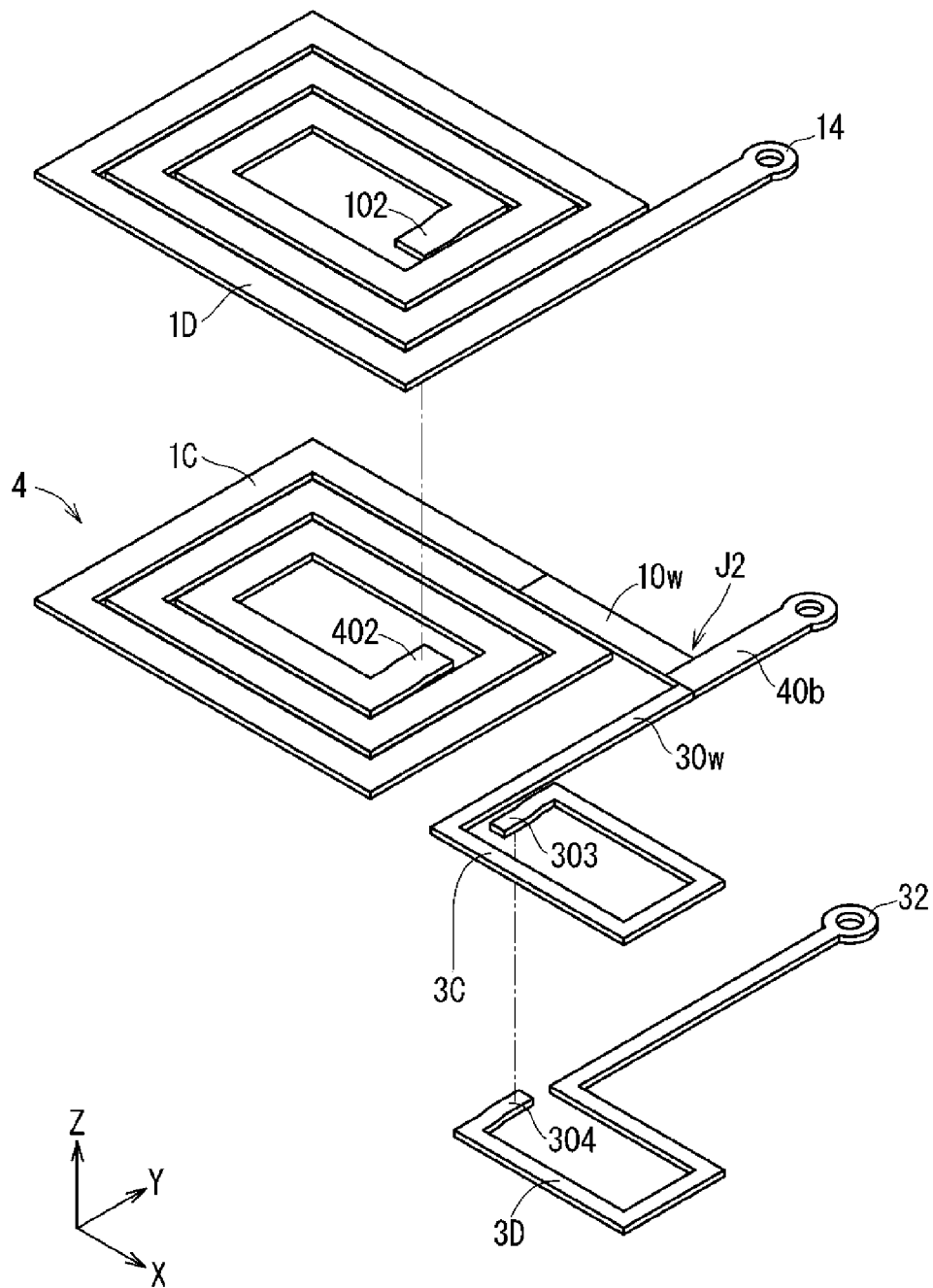
FIG. 11 is a perspective view showing parts of the composite component according to the second embodiment, with intervals therebetween widened along one direction.

FIG. 11 is a perspective view showing parts of the composite component 400B, specifically, a structure from which the cores 5 and 33 are omitted, with intervals therebetween widened along the Z direction. Each of the two dashed dotted lines extending along the Z direction connects two portions connected in the Z direction.

The primary winding 10 includes a first layer 1C and a second layer 1D. The first layer 1C and the second layer 1D are located so as to be arranged in this order along the Z direction. The first layer 1C has a first portion 10w and a connection portion 402. The first layer 1C is wound clockwise around the core 5 as viewed along the Z direction as the first layer 1C extends from the first portion 10w toward the connection portion 402.

The first portion 10w is a portion of the primary winding 10, but is not surrounded by the core 5, and does not connect portions of the primary winding 10 that are surrounded by the core 5. Accordingly, the first portion 10w functions as wiring without being coupled to the secondary winding 20. The first portion 10w forms a three-way junction J2 together with a second portion 30w and wiring 40b, which will be described below. The boundary of the first portion 10w is virtually shown.

The second layer 1D has a connection portion 102, and is connected to the terminal 14 on the side opposite to the connection portion 102. In the second embodiment, the connection between the second layer 1D and the terminal 14 is achieved by forming the second layer 1D and the terminal 14 as one piece. The second layer 1D is wound clockwise around the core 5 as viewed along the Z direction as the second layer 1D extends from the connection portion 102 toward the terminal 14.

The connection portion 402 is inclined or protrudes toward the Z direction relative to portions of the first layer 1C other than the connection portion 402. The connection portion 102 is inclined or protrudes toward the side opposite to the Z direction relative to portions of the second layer 1D other than the connection portion 102. The connection portion 102 of the first layer 1C and the connection portion 402 of the second layer 1D are connected to each other in the Z direction. The first layer 1C and the second layer 1D are not in contact with each other at portions other than the connection portions 102 and 402. The primary winding 10 includes the first layer 1C and the second layer 1D. Accordingly, the primary winding 10 is wound counterclockwise around the core 5 as viewed along the Z direction as the primary winding 10 extends from the first portion 10w toward the terminal 14.

The coil 30 includes a first layer 3C and a second layer 3D. The second layer 3D and the first layer 3C are located so as to be arranged in this order along the Z direction. The first layer 3C has a second portion 30w and a connection portion 303. The first layer 3C is wound clockwise around the core 33 as viewed along the Z direction as the first layer 3C extends from the second portion 30w toward the connection portion 303.

The second portion 30w is a portion of the coil 30, but is not surrounded by the core 33, and does not connect portions of the coil 30 that are surrounded by the core 33. Accordingly, the second portion 30w functions as wiring. The second portion 30w forms the three-way junction J2 together with the first portion 10w and wiring 40b, which will be described below. The boundary of the second portion 30w is virtually shown.

The second layer 3D has a connection portion 304, and is connected to the terminal 32 on the side opposite to the connection portion 304. In the second embodiment, the connection between the second layer 3D and the terminal 32 is achieved by forming the second layer 3D and the terminal 32 as one piece. The second layer 3D is wound clockwise around the core 33 as viewed along the Z direction as the second layer 3D extends from the connection portion 304 toward the terminal 32.

The connection portion 304 is inclined or protrudes toward the Z direction side relative to portions of the second layer 3D other than the connection portion 304. The connection portion 303 is inclined or protrudes toward the side opposite to the Z direction side relative to portions of the first layer 3C other than the connection portion 303. The connection portion 303 of the first layer 3C and the connection portion 304 of the second layer 3D are connected to each other in the Z direction. The first layer 3C and the second layer 3D are not in contact with each other at portions other than the connection portions 303 and 304. The coil 30 includes the first layer 3C and the second layer 3D. Accordingly, the coil 30 is wound clockwise around the core 33 as viewed along the Z direction as the coil 30 extends from the second portion 30w toward the terminal 32.

The conductor 4 includes first layers 1C and 3C, wiring 40b, and a terminal 41. The wiring 40b forms the three-way junction J2 together with the first portion 10w and the second portion 30w. In FIGS. 9, 10, and 11, a case is illustrated where the wiring 40b extends in the Y direction toward the terminal 41, the first portion 10w extends in the X direction toward the wiring 40b, and the second portion 30w extends in a direction opposite to the X direction toward the wiring 40b. In the drawing, the boundary of the wiring 40b is virtually shown.

A case is illustrated where the terminal 14 is disposed on the Y-direction side as viewed from the second layer 1D. A case is illustrated where the terminal 41 is disposed on the Y-direction side as viewed from the first layers 1C and 3C. A case is illustrated where the terminal 32 is disposed on the Y-direction side as viewed from the second layer 3D. A case is illustrated where the terminals 14 and 41 are disposed on the Y-direction side as viewed from the primary winding 10. A case is illustrated where the terminals 32 and 41 are disposed on the Y-direction side as viewed from the coil 30.

All of the second layers 1D and 3D and the conductor 4 can be implemented using a monolithic steel plate obtained through punching, for example. It is advantageous to adopt a monolithic steel plate for a portion of the primary winding 10 that includes at least the first portion 10w, a portion of the coil 30 that includes at least the second portion 30w, and the wiring 40b, because the three-way junction J2 can be easily formed. The connection between the connection portions 303 and 304 in the Z direction, and the connection between the connection portions 102 and 402 in the Z direction can both be realized through crimping, soldering, or welding, for example.

The composite component 400B can be described as follows. The composite component 400B includes a primary winding 10, a secondary winding 20, a coil 30, a first terminal 14, a second terminal 32, a third terminal 21a, a fourth terminal 21b, a fifth terminal 21c, a sixth terminal 41, and wiring 40b. The primary winding 10 and the secondary winding 20 in combination function as a transformer 100.

The secondary winding 20 is connected between the third terminal 21a and the fourth terminal 21b. The fifth terminal 21c functions as a center tap of the secondary winding 20.

The sixth terminal 41 is connected to the first terminal 14 via the wiring 40b and the primary winding 10. The sixth terminal 41 is connected to the second terminal 32 via the wiring 40b and the coil 30.

A first portion 10w of the primary winding 10 that is connected to the wiring 40b, a second portion 30w of the coil 30 that is connected to the wiring 40b, and the wiring 40b constitute a three-way junction J2.

The sixth terminal 41 is located away from the primary winding 10 and the coil 30 along the Y direction. The Y direction is nonparallel to a plane determined by the Z direction and the X direction. In the above-described example, the Y direction is orthogonal to both the Z direction and the X direction.

Each of the primary winding 10, the secondary winding 20, and the coil 30 is wound with the Z direction serving as the axial direction. The primary winding 10 and the coil 30 are disposed adjacent to each other in the X direction, which is different from the Z direction. By adopting such an arrangement, the composite component 400B can be formed flat, and hence compact, as in the case of the composite component 400A.

In the composite component 400B, the direction in which the primary winding 10 is wound relative to the Z direction as the primary winding 10 extends from the first terminal 14 toward the first portion 10w, and the direction in which the coil 30 is wound as viewed along the Z direction when the coil 30 extends from the second terminal 32 toward the second portion 30w are the same direction. This direction is one of two rotation directions as viewed along the Z direction, the rotation direction having a larger rotation angle required to reach the Y direction from the X direction. In the above-described example, this direction is counterclockwise as viewed along the Z direction.

In the composite component 400A described in the first embodiment, the direction in which the primary winding 10 is wound relative to the Z direction when the primary winding 10 extends from the first terminal 14 toward the first portion 10t is counterclockwise as viewed along the Z direction. The direction in which the coil 30 is wound relative to the Z direction when the coil 30 extends from the second terminal 32 toward the second portion 30t is clockwise as viewed along the Z direction. That is, the two wound directions are different from each other.

A circuit diagram of a full-bridge converter when the composite component 400B is adopted can also be represented by FIG. 8.

The inductor La1 equivalently indicates the leakage inductance of the transformer 100. The inductor L1t equivalently indicates the inductance of the first portion 10w. The inductance of the portion of the primary winding 10 that is not surrounded by the core 5 on the terminal 14 side, and that does not connect portions of the primary winding 10 that are surrounded by the core 5 is considered as being included in the inductor La1.

The inductor L3t equivalently indicates the inductance of the second portion 30w. The inductor Lb1 equivalently represents the inductance of portions of the coil 30 other than the second portion 30w. The inductance of the portion of the coil 30 that is not surrounded by the core 33 on the terminal 32 side, and that does not connect portions of the core 33 that are surrounded by the coil 30 is considered as being included in the inductor Lb1.

The inductor L40 indicates the inductance of the wiring 40b. Since the wiring 40b, the first portion 10w, and the second portion 30w constitute the three-way junction J2, one end of the inductor L40, one end of the inductor L3t, and one end of the inductor L1t are shown connected to form a Y shape or a T shape.

As in the case of the first embodiment, the other end of the inductor L40 is shown connected to the terminal 41, the other end of the inductor L1t is shown connected to the inductor La1, and the other end of the inductor L3t is shown connected to the inductor Lb1.

As in the case of the composite component 400A, in the composite component 400B, the inductors Lb1, Lb2, La2, and La1 of the comparative example correspond to the inductors Lb1, L3t, L1t, and La1, respectively. No current flows through the inductor L40 during a transition from the first state to the second state. The inductance of the inductor L40 does not affect the surge voltage.

In the above-described comparative example, the inductor La2 that equivalently indicates the inductance of the first portion 10s, and the inductor Lb2 that equivalently indicates the inductance of the second portion 30s both contribute to the above-described surge voltage.

The first portion 10w of the composite component 400B is shorter than the first portion 10s of the comparative example, and La2>L1t holds true. The second portion 30w of the composite component 400B has a length comparable to that of the second portion 30s of the comparative example, and Lb2≈L3t holds true. Accordingly, the inductance affecting the above-described surge voltage and the surge voltage are both smaller in the composite component 400B than those in the comparative example. Therefore, the composite component 400B is less likely to impair the effect of suppressing the surge voltage, as compared with the comparative example.

Moreover, the ratio (Lb1+L3t)/(L1t+La1) of the inductance contributing to suppression of the surge voltage is likely to be set large, as compared with that in the composite component 400A. This is preferable from the viewpoint of substantially improving the effect of suppressing the surge voltage using the inductor 3.

Third Embodiment

Figure 12:
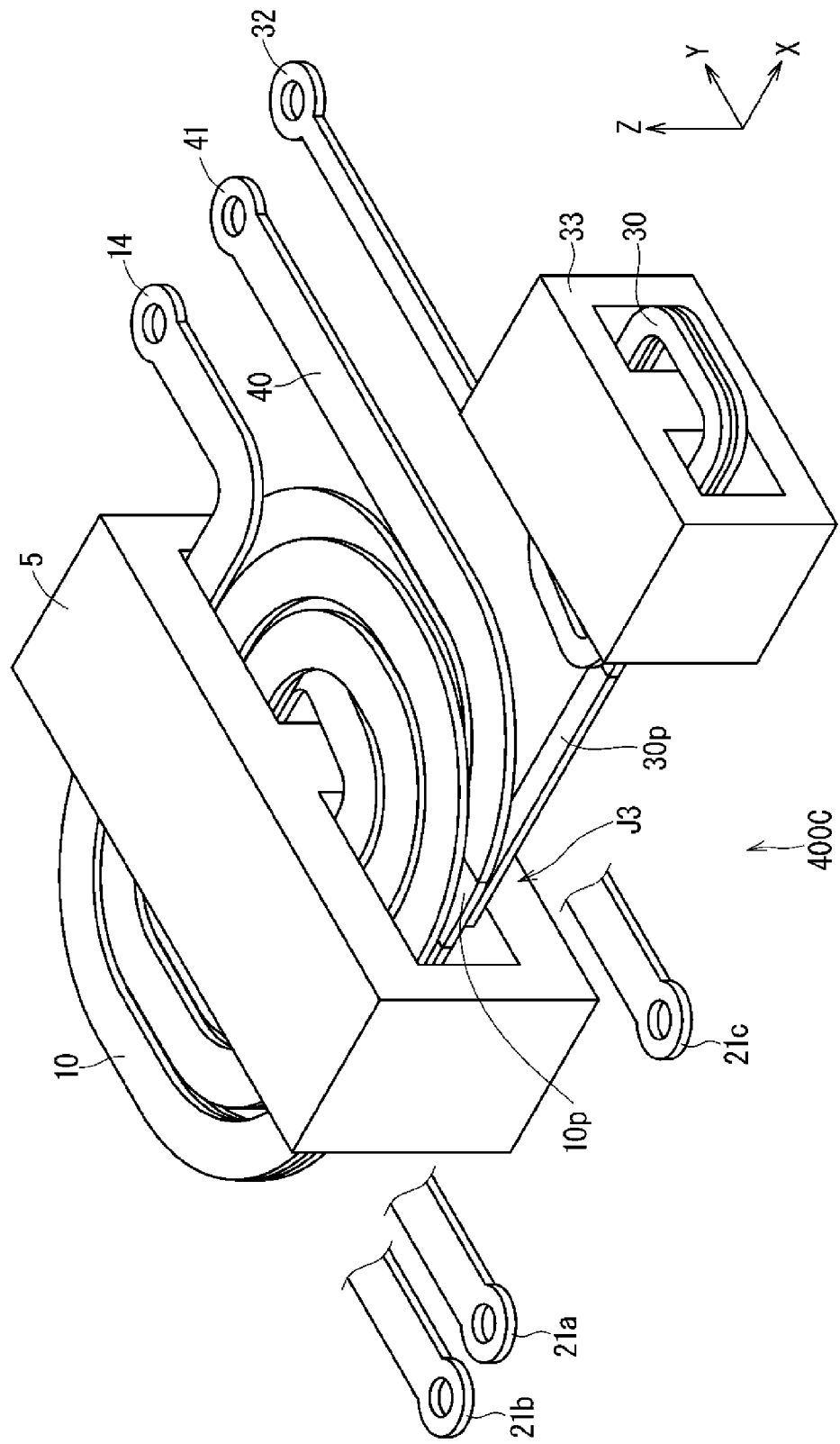
FIG. 12 is a perspective view illustrating the composite component according to the third embodiment.
Figure 13:
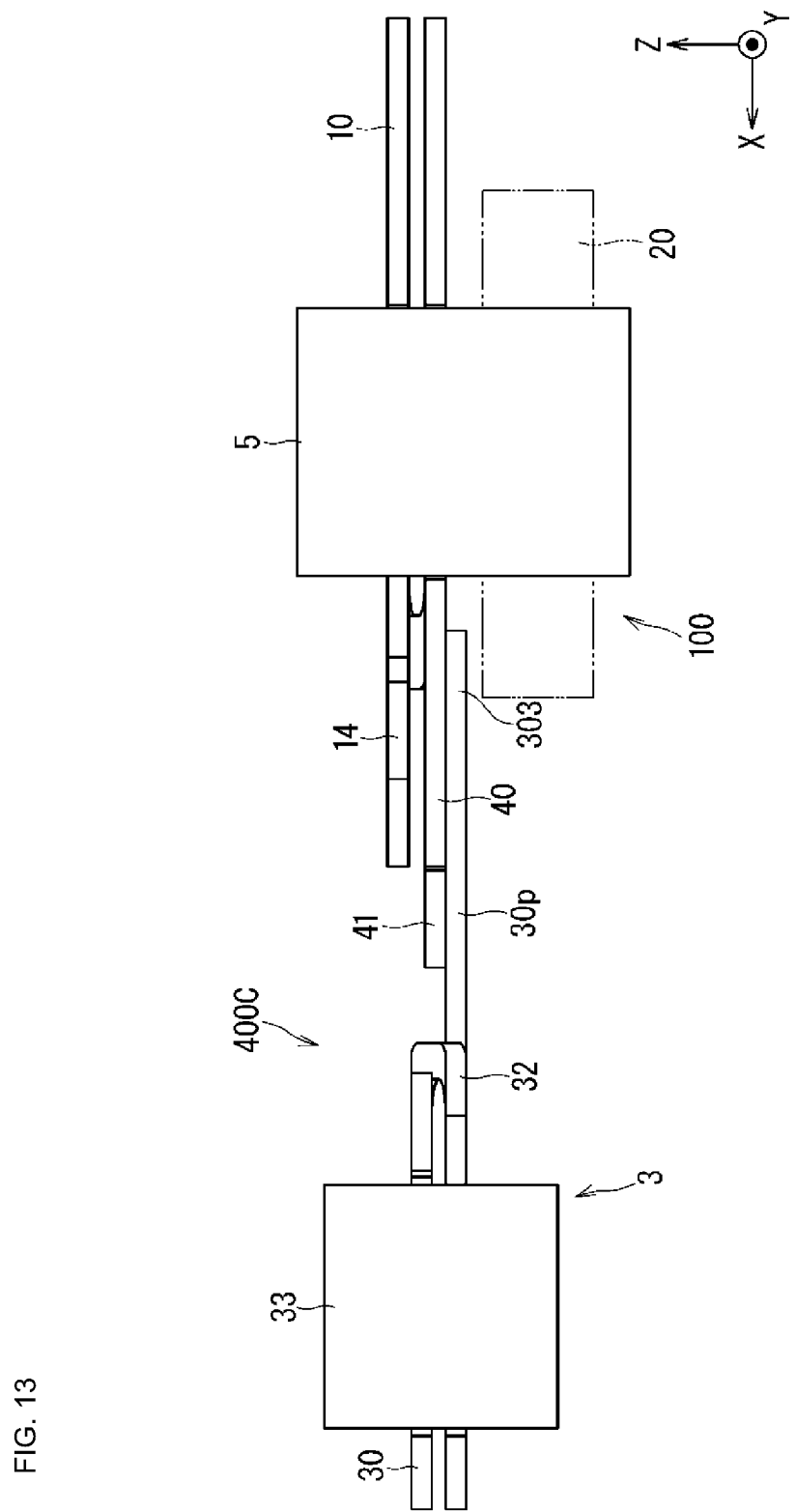
FIG. 13 is a side view illustrating the composite component according to the third embodiment.

FIG. 12 is a perspective view illustrating a composite component 400C according to a third embodiment. FIG. 13 is a side view illustrating the composite component 400C. The composite component 400C includes a transformer 100 and an inductor 3. A direction extending from the transformer 100 toward the inductor 3 is shown as the X direction.

A primary winding 10 and a secondary winding 20 are wound around a core 5. The axial direction of this winding is shown as the Z direction in the drawings. The core 5 is an EI-type core, for example. To keep the drawing from becoming complex, the secondary winding 20 is not shown in FIG. 12, and is indicated by a dashed double-dotted line indicating its position in FIG. 13. The primary winding 10 and the secondary winding 20 are coupled to each other with the same polarity via the core 5, and in combination function as the transformer 100.

Terminals 21a, 21b, and 21c function as secondary-side terminals of the transformer 100. The secondary winding 20 is connected between the terminal 21a and the terminal 21b. The terminal 21c functions as a center tap of the secondary winding 20.

The inductor 3 includes a coil 30, a terminal 32, and a core 33. The coil 30 is wound around the core 33. The axial direction of this winding is shown as the Z direction in the drawings. The core 33 is an EI-type core, for example.

Figure 14:
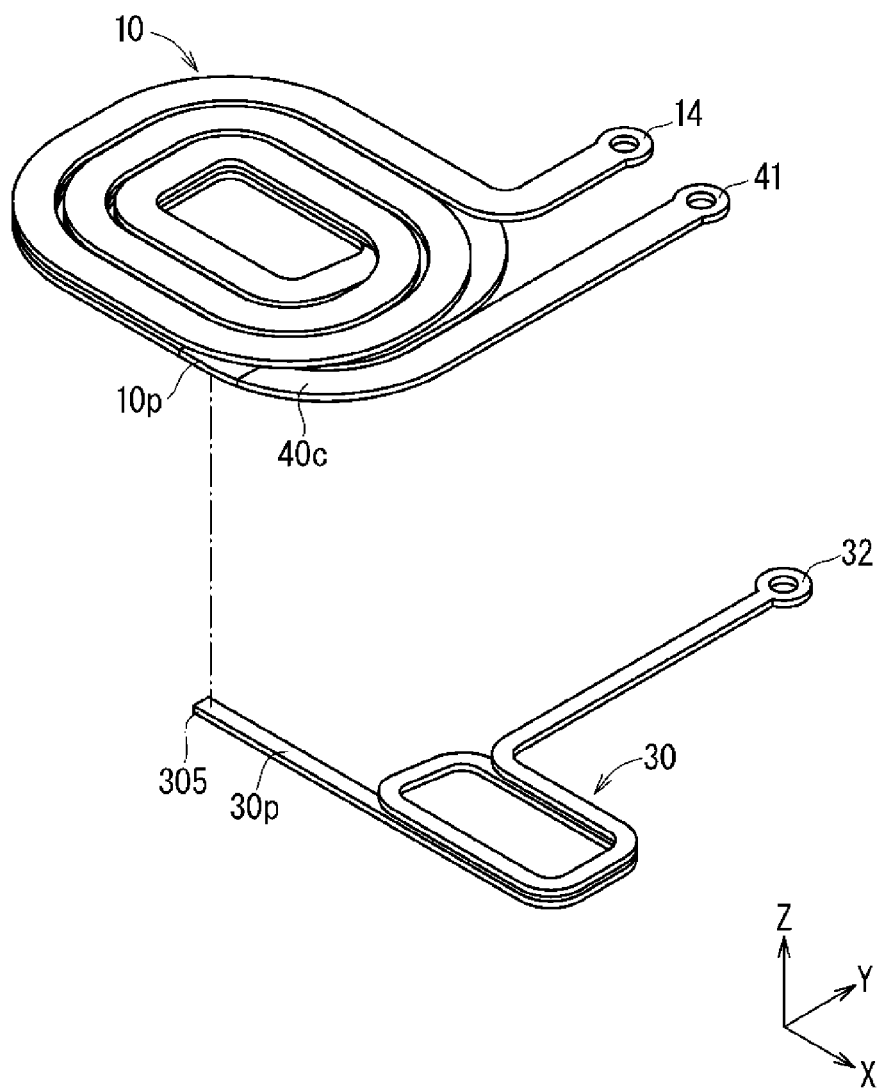
FIG. 14 is a perspective view showing parts of the composite component according to the third embodiment, with intervals therebetween widened along one direction.

FIG. 14 is a perspective view showing parts of the composite component 400C, specifically, a structure from which the cores 5 and 33 are omitted, with intervals therebetween widened along the Z direction. Each of the two dashed dotted lines extending along the Z direction connects two portions connected in the Z direction.

The primary winding 10 is wound with the Z direction serving as the axial direction. Here, a case is illustrated where the primary winding 10 is wound in two layers along the Z direction. The primary winding 10 is connected to the terminal 41 via wiring 40c. In the third embodiment, the connection between the primary winding 10 and the wiring 40c is achieved by forming the primary winding 10 and the wiring 40c as one piece.

The primary winding 10 has a first portion 10p on the wiring 40c side thereof. The primary winding 10 is connected to the terminal 14 on the side opposite to the first portion 10p. In the third embodiment, the connection between the primary winding 10 and the terminal 14 is achieved by forming the primary winding 10 and the terminal 14 as one piece.

The primary winding 10 is wound counterclockwise around the core 5 as viewed along the Z direction as the primary winding 10 extends from the first portion 10p toward the terminal 14.

The first portion 10p is a portion of the primary winding 10, but is not surrounded by the core 5, and does not connect portions of the primary winding 10 that are surrounded by the core 5. Accordingly, the first portion 10p functions as wiring without being coupled to the secondary winding 20. The first portion 10p forms a three-way junction J3 together with the wiring 40c and a second portion 30p, which will be described below. The boundary of the first portion 10p is virtually shown.

The coil 30 is wound with the Z direction serving as the axial direction. Here, a case is illustrated where the coil 30 is wound in two layers along the Z direction. The coil 30 is connected to the terminal 32. In the third embodiment, the connection between the coil 30 and the terminal 32 is achieved by forming the coil 30 and the terminal 32 as one piece.

The coil 30 has a second portion 30p on the side opposite to the terminal 32. An end portion of the second portion 30p that is on the side opposite to the terminal 32 functions as a connection portion 305.

The second portion 30p is a portion of the coil 30, but is not surrounded by the core 33, and does not connect portions of the coil 30 that are surrounded by the core 33. Accordingly, the second portion 30p functions as wiring. The second portion 30p forms the three-way junction J3 together with the first portion 10p and the wiring 40c. The boundary of the second portion 30p is virtually shown.

The coil 30 is wound clockwise around the core 33 as viewed along the Z direction as the coil 30 extends from the second portion 30p toward the terminal 32.

The connection portion 305 is connected to the wiring 40c side of the first portion 10p on the side opposite to the Z direction.

The primary winding 10 and the coil 30 can both be implemented using a flat rectangular wire, for example. It is preferable to adopt a flat rectangular wire for both the primary winding 10 and the coil 30, because a multi-layer primary winding 10 and a multi-layer coil 30 can be easily formed. The connection between the connection portion 305 and the first portion 10p in the Z direction both can be realized through crimping, soldering, or welding, for example.

The composite component 400C can be described as follows. The composite component 400C includes a primary winding 10, a secondary winding 20, a coil 30, a first terminal 14, a second terminal 32, a third terminal 21a, a fourth terminal 21b, a fifth terminal 21c, a sixth terminal 41, and wiring 40c. The primary winding 10 and the secondary winding 20 in combination function as a transformer 100.

The secondary winding 20 is connected between the third terminal 21a and the fourth terminal 21b. The fifth terminal 21c functions as a center tap of the secondary winding 20.

The sixth terminal 41 is connected to the first terminal 14 via the wiring 40c and the primary winding 10. The sixth terminal 41 is connected to the second terminal 32 via the wiring 40c and the coil 30.

A first portion 10p of the primary winding 10 that is connected to the wiring 40c, a second portion 30p of the coil 30 that is connected to the wiring 40c, and the wiring 40c constitute a three-way junction J3.

The sixth terminal 41 is located away from the primary winding 10 and the coil 30 along the Y direction. The Y direction is nonparallel to a plane determined by the Z direction and the X direction. In the above-described example, the Y direction is orthogonal to both the Z direction and the X direction.

Each of the primary winding 10, the secondary winding 20, and the coil 30 is wound with the Z direction serving as the axial direction. The primary winding 10 and the coil 30 are disposed adjacent to each other in the X direction, which is different from the Z direction. Accordingly, as in the cases of the composite components 400A and 400B, the composite component 400C also can be formed flat, and hence compact.

Each of the primary winding 10, the secondary winding 20, and the coil 30 is wound with the Z direction serving as the axial direction. The primary winding 10 and the coil 30 are disposed adjacent to each other in the X direction. The X direction is different from the Z direction. In the above-described example, the X direction is orthogonal to the Z direction.

In the composite component 400C, the direction in which the primary winding 10 is wound relative to the Z direction when the primary winding 10 extends from the first terminal 14 toward the first portion 10p, and the direction in which the coil 30 is wound as viewed along the Z direction when the coil 30 extends from the second terminal 32 toward the second portion 30p are opposite directions.

A circuit diagram of a full-bridge converter when the composite component 400C is adopted also can be represented by FIG. 8.

The first portion 10p of the composite component 400C is shorter than the first portion 10s of the comparative example, and $La1 > L1t$ holds true. The second portion 30p of the composite component 400B is shorter than the second portion 30s of the comparative example, and $Lb2 > L3t$ holds true. Accordingly, the inductance affecting the above-described surge voltage and the surge voltage are both smaller in the composite component 400C than those in the comparative example. Therefore, the composite component 400C is less likely to impair the effect of suppressing the surge voltage, as compared with the comparative example.

Moreover, the ratio $(Lb1+L3t)/(L1t+La1)$ of the inductance contributing to suppression of the surge voltage is likely to be set large, as compared with that in the composite component 400A. This is preferable from the viewpoint of substantially improving the effect of suppressing the surge voltage using the inductor 3.

Fourth Embodiment

Figure 15:
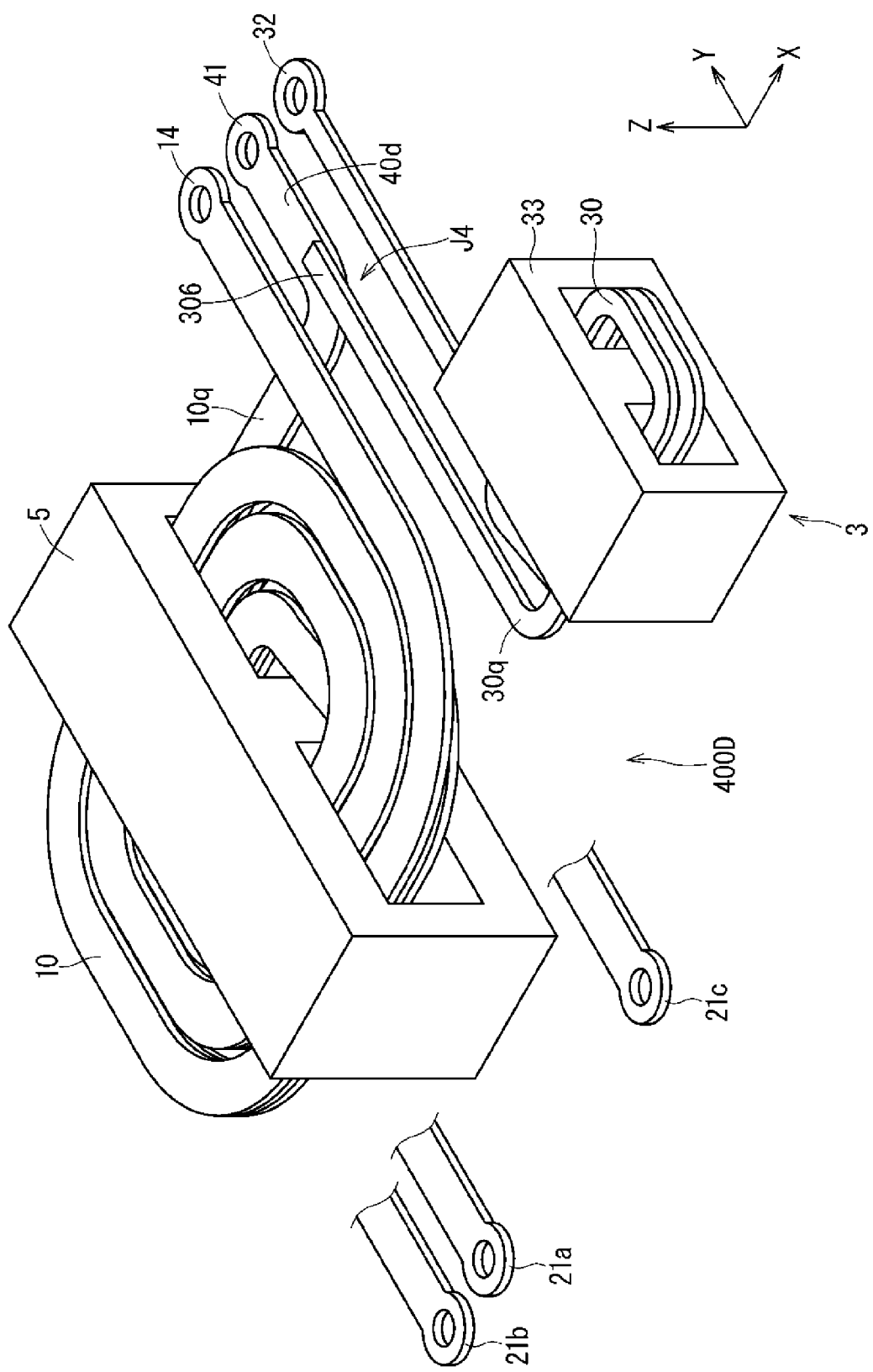
FIG. 15 is a perspective view illustrating the composite component according to the fourth embodiment.
Figure 16:
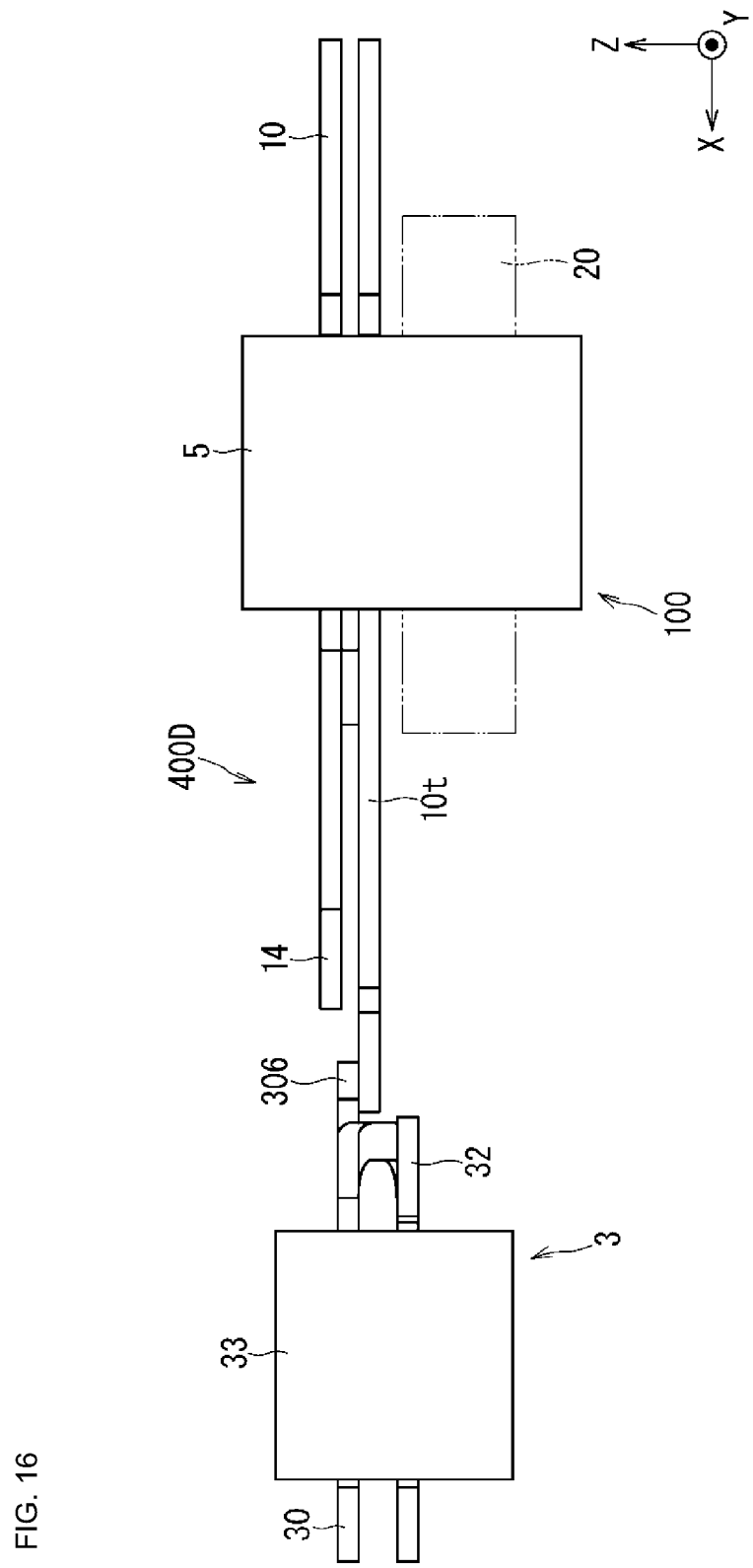
FIG. 16 is a side view illustrating the composite component according to the fourth embodiment.

FIG. 15 is a perspective view illustrating a composite component 400D according to a fourth embodiment. FIG. 16 is a side view illustrating the composite component 400D. The composite component 400D includes a transformer 100 and an inductor 3. A direction extending from the transformer 100 toward the inductor 3 is shown as the X direction.

A primary winding 10 and a secondary winding 20 are wound around a core 5. The axial direction of this winding is shown as the Z direction in the drawings. The core 5 is an EI-type core, for example. To keep the drawing from becoming complex, the secondary winding 20 is not shown in FIG. 15, and is indicated by a dashed double-dotted line indicating its position in FIG. 16. The primary winding 10 and the secondary winding 20 are coupled to each other with the same polarity via the core 5, and in combination function as the transformer 100.

Terminals 21a, 21b, and 21c function as secondary-side terminals of the transformer 100. The secondary winding 20 is connected between the terminal 21a and the terminal 21b. The terminal 21c functions as a center tap of the secondary winding 20.

The inductor 3 includes a coil 30, a terminal 32, and a core 33. The coil 30 is wound around the core 33. The axial direction of this winding is shown as the Z direction in the drawings. The core 33 is an EI-type core, for example.

Figure 17:
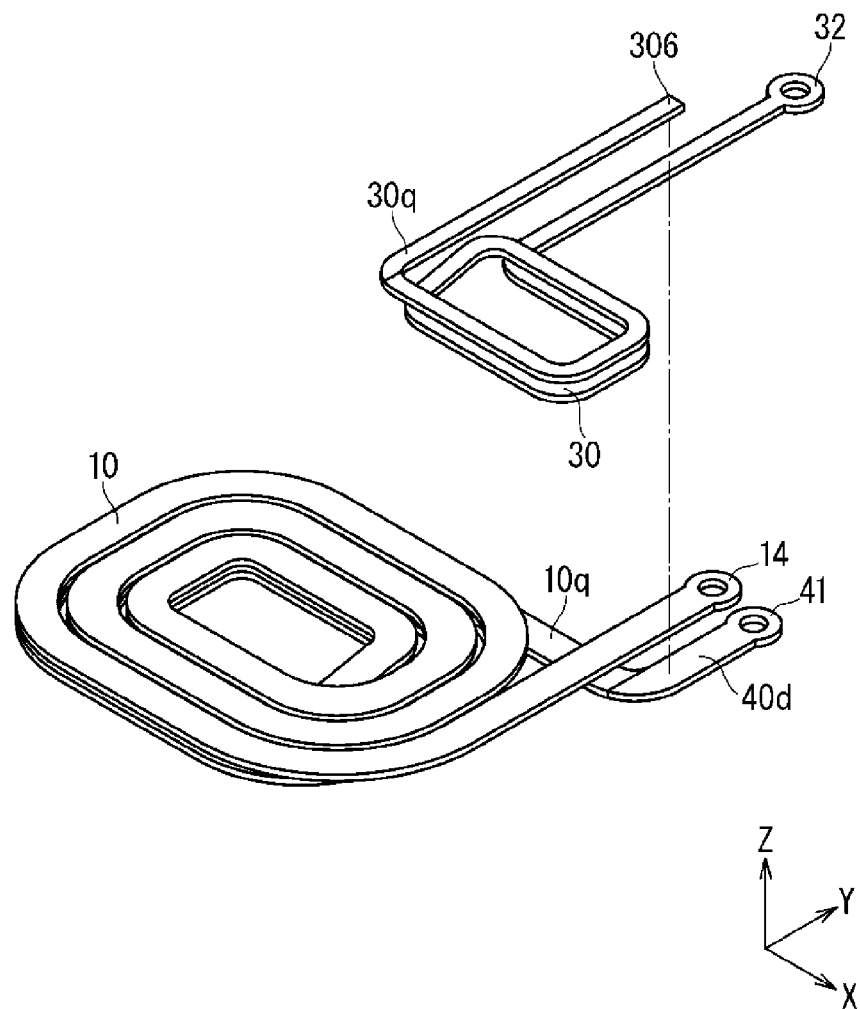
FIG. 17 is a perspective view showing parts of the composite component according to the fourth embodiment, with intervals therebetween widened along one direction.

FIG. 17 is a perspective view showing parts of the composite component 400D, specifically, a structure from which the cores 5 and 33 are omitted, with intervals therebetween widened along the Z direction. Each of the two dashed dotted lines extending along the Z direction connects two portions connected in the Z direction.

The primary winding 10 is wound with the Z direction serving as the axial direction. Here, a case is illustrated where the primary winding 10 is wound in two layers along the Z direction. The primary winding 10 is connected to the terminal 41 via wiring 40d. In the third embodiment, the connection between the primary winding 10 and the wiring 40d is achieved by forming the primary winding 10 and the wiring 40d as one piece.

The primary winding 10 has a first portion 10q on the wiring 40d side. The primary winding 10 is connected to the terminal 14 on the side opposite to the first portion 10q. In the fourth embodiment, the connection between the primary winding 10 and the terminal 14 is achieved by forming the primary winding 10 and the terminal 14 as one piece.

The primary winding 10 is wound counterclockwise around the core 5 as viewed along the Z direction as the primary winding 10 extends from the first portion 10q toward the terminal 14.

The first portion 10q is a portion of the primary winding 10, but is not surrounded by the core 5, and does not connect portions of the primary winding 10 that are surrounded by the core 5. Accordingly, the first portion 10q functions as wiring without being coupled to the secondary winding 20. The first portion 10q forms a three-way junction J4 together with the wiring 40d and a second portion 30q, which will be described below. The boundary of the first portion 10q is virtually shown.

The coil 30 is wound with the Z direction serving as the axial direction. Here, a case is illustrated where the coil 30 is wound in two layers along the Z direction. The coil 30 is connected to the terminal 32. In the fourth embodiment, the connection between the coil 30 and the terminal 32 is achieved by forming the coil 30 and the terminal 32 as one piece.

The coil 30 has a second portion 30q on the side opposite to the terminal 32. An end portion of the second portion 30q that is on the side opposite to the terminal 32 functions as a connection portion 306.

The second portion 30q is a portion of the coil 30, but is not surrounded by the core 33, and does not connect portions of the coil 30 that are surrounded by the core 33. Accordingly, the second portion 30q functions as wiring. The second portion 30q forms the three-way junction J4 together with the first portion 10q and the wiring 40d. The boundary of the second portion 30q is virtually shown.

The coil 30 is wound clockwise around the core 33 as viewed along the Z direction as the coil 30 extends from the second portion 30q toward the terminal 32.

The connection portion 306 is connected to the first portion 10q side of the wiring 40d on the Z direction side.

The primary winding 10 and the coil 30 both can be implemented using a flat rectangular wire, for example. It is preferable to adopt a flat rectangular wire for both the primary winding 10 and the coil 30, because a multi-layer primary winding 10 and a multi-layer coil 30 can be easily formed. The connection between the connection portion 306 and the wiring 40d in the Z direction can both be realized through crimping, soldering, or welding, for example.

The composite component 400D can be described as follows. The composite component 400D includes a primary winding 10, a secondary winding 20, a coil 30, a first terminal 14, a second terminal 32, a third terminal 21a, a fourth terminal 21b, a fifth terminal 21c, a sixth terminal 41, and wiring 40d. The primary winding 10 and the secondary winding 20 in combination function as a transformer 100.

The secondary winding 20 is connected between the third terminal 21a and the fourth terminal 21b. The fifth terminal 21c functions as a center tap of the secondary winding 20.

The sixth terminal 41 is connected to the first terminal 14 via the wiring 40d and the primary winding 10. The sixth terminal 41 is connected to the second terminal 32 via the wiring 40d and the coil 30.

A first portion 10q of the primary winding 10 that is connected to the wiring 40d, a second portion 30q of the coil 30 that is connected to the wiring 40d, and the wiring 40d constitute a three-way junction J4.

The sixth terminal 41 is located away from the primary winding 10 and the coil 30 along the Y direction. The Y direction is nonparallel to a plane determined by the Z direction and the X direction. In the above-described example, the Y direction is orthogonal to both the Z direction and the X direction.

Each of the primary winding 10, the secondary winding 20, and the coil 30 is wound with the Z direction serving as the axial direction. The primary winding 10 and the coil 30 are disposed adjacent to each other in the X direction, which is different from the Z direction. By adopting such an arrangement, as in the cases of the composite components 400A, 400B, and 400C, the composite component 400D can also be formed flat, and hence compact.

In the composite component 400D, the direction in which the primary winding 10 is wound relative to the Z direction as the primary winding 10 extends from the first terminal 14 toward the first portion 10q, and the direction in which the coil 30 is wound as viewed along the Z direction when the coil 30 extends from the second terminal 32 toward the second portion 30q are the same direction. This direction is one of two rotation directions as viewed along the Z direction, the rotation direction having a larger rotation angle required to reach the Y direction from the X direction. In the above-described example, this direction is counterclockwise as viewed along the Z direction.

A circuit diagram of a full-bridge converter when the composite component 400D is adopted can also be represented by FIG. 8.

The first portion 10q of the composite component 400D is shorter than the first portion 10s of the comparative example, and La1>L1t holds true. The second portion 30q of the composite component 400D has a length comparable to that of the second portion 30s of the comparative example, and Lb2≈L3t holds true. Accordingly, the inductance affecting the above-described surge voltage and the surge voltage are both smaller in the composite component 400D than those in the comparative example. Therefore, the composite component 400D is less likely to impair the effect of suppressing the surge voltage, as compared with the comparative example.

Moreover, the ratio (Lb1+L3t)/(L1t+La1) of the inductance contributing to suppression of the surge voltage is likely to be set large, as compared with that in the composite component 400A. This is preferable from the viewpoint of substantially improving the effect of suppressing the surge voltage using the inductor 3.

Appendix

The terminal 14 and the terminal 32 may be located on the side opposite to the transformer 100 and the inductor 3 in the Y direction. The reason being that adopting such positioning does not reduce the effect realized by the three-way junctions J1, J2, J3, and J4.

The cores 5 and 33 may be fixed to each other using a nonmagnetic member. Firmly fixing the cores 5 and 33 to each other makes the configuration of each of the composite components 400A, 400B, 400C, and 400D robust. The nonmagnetic properties of the above-described member prevent undesired coupling of magnetic flux.

It should be appreciated that the configurations described in the embodiments and modifications above may be combined as appropriate as long as there are no mutual inconsistencies.

The invention claimed is:

1. A composite component comprising:
a primary winding, a secondary winding, a coil, a first terminal, a second terminal, a third terminal, a fourth terminal, a fifth terminal, a sixth terminal, and a wiring,
wherein the primary winding and the secondary winding in combination function as a transformer,
the secondary winding is connected between the third terminal and the fourth terminal,
the fifth terminal functions as a center tap of the secondary winding,
the sixth terminal is connected to the first terminal via the wiring and the primary winding,
the sixth terminal is connected to the second terminal via the wiring and the coil, and
a first portion of the primary winding is disposed on an end of the primary winding that is opposite of the first terminal is connected to the wiring, and a second portion of the coil is disposed on an end of the coil that is opposite of the second terminal, wherein the first portion and the second portion are connected to the wiring so as to form an inductor and a three-way junction, wherein the first portion and the second portion of the wiring are disposed on the same plane.

2. The composite component according to claim 1, wherein each of the primary winding, the secondary winding, and the coil is wound with a first direction serving as an axial direction,
the primary winding and the coil are disposed adjacent to each other in a second direction, and
the second direction is different from the first direction.

3. The composite component according to claim 2, wherein the sixth terminal is located away from the primary winding and the coil along a third direction,
the third direction is nonparallel to a plane determined by the first direction and the second direction, and
each of a direction in which the primary winding is wound relative to the first direction as the primary winding extends from the first terminal toward the first portion, and a direction in which the coil is wound relative to the first direction as the coil extends from the second terminal toward the second portion is one of two rotation directions as viewed along the first direction, the rotation direction having a larger rotation angle required to reach the third direction from the second direction so as to wind in one of a clockwise and counter clockwise direction.

4. The composite component according to claim 1, wherein a portion of the primary winding that includes at least the first portion,
a portion of the coil that includes at least the second portion, and the wiring are formed of a monolithic steel plate.

5. The composite component according to claim 2, wherein the primary winding is formed of a first flat rectangular wire, and the coil is formed of a second flat rectangular wire, and
the second portion of the second flat rectangular wire is connected to the first flat rectangular wire in the first direction, with the first flat rectangular wire including the first portion and the wiring, or the first portion of the first flat rectangular wire is connected to the second flat rectangular wire in the first direction, with the second flat rectangular wire including the second portion and the wiring.

6. The composite component according to claim 2, wherein a portion of the primary winding that includes at least the first portion,
a portion of the coil that includes at least the second portion, and the wiring are formed of a monolithic steel plate.

7. The composite component according to claim 3, wherein a portion of the primary winding that includes at least the first portion,
a portion of the coil that includes at least the second portion, and the wiring are formed of a monolithic steel plate.

8. The composite component according to claim 3, wherein the primary winding is formed of a first flat rectangular wire, and the coil is formed of a second flat rectangular wire, and the second portion of the second flat rectangular wire is connected to the first flat rectangular wire in the first direction, with the first flat rectangular wire including the first portion and the wiring, or the first portion of the first flat rectangular wire is connected to the second flat rectangular wire in the first direction, with the second flat rectangular wire including the second portion and the wiring.

9. A composite component comprising:

a primary winding, a secondary winding, a coil, a first terminal, a second terminal, a third terminal, a fourth terminal, a fifth terminal, a sixth terminal, and a wiring, wherein the primary winding and the secondary winding in combination function as a transformer, the secondary winding is connected between the third terminal and the fourth terminal, the fifth terminal functions as a center tap of the secondary winding, the sixth terminal is connected to the first terminal via the wiring and the primary winding, the sixth terminal is connected to the second terminal via the wiring and the coil, and a first portion of the primary winding is disposed on an end of the primary winding that is opposite of the first terminal is connected to the wiring, and a second portion of the coil is disposed on an end of the coil that is opposite of the second terminal, wherein the first portion and the second portion are connected to the wiring so as to form an inductor and a three-way junction, wherein the first portion and the second portion are coaxial with each other and the wiring is orthogonal to both the first portion and the second portion and extends along a portion of the primary winding.

* * * * *